(12) United States Patent
Li et al.

(10) Patent No.: US 10,693,180 B2
(45) Date of Patent: Jun. 23, 2020

(54) SOLID-STATE POLYMER LITHIUM BATTERY PACK AND PREPARATION METHOD THEREOF

(71) Applicant: NATIONAL UNIVERSITY OF DEFENSE TECHNOLOGY, Changsha, Hunan (CN)

(72) Inventors: Dongxu Li, Hunan (CN); Dezhan Li, Hunan (CN); Jianwen Liu, Hunan (CN); Changping Yin, Hunan (CN); Peng Zhao, Hunan (CN); Fubiao Yang, Hunan (CN)

(73) Assignee: NATIONAL UNIVERSITY OF DEFENSE TECHNOLOGY, Changsha, Hunan (CN)

(*) Notice: Subject to any disclaimer, the term of this patent is extended or adjusted under 35 U.S.C. 154(b) by 61 days.

(21) Appl. No.: 15/753,972

(22) PCT Filed: Jul. 12, 2016

(86) PCT No.: PCT/CN2016/000379
§ 371 (c)(1),
(2) Date: Feb. 20, 2018

(87) PCT Pub. No.: WO2017/193227
PCT Pub. Date: Nov. 16, 2017

(65) Prior Publication Data
US 2018/0254514 A1   Sep. 6, 2018

(30) Foreign Application Priority Data

May 10, 2016 (CN) .......................... 2016 1 0305852

(51) Int. Cl.
*H01M 10/0525* (2010.01)
*H01M 10/0585* (2010.01)
(Continued)

(52) U.S. Cl.
CPC ......... *H01M 10/0525* (2013.01); *H01M 2/08* (2013.01); *H01M 2/1016* (2013.01);
(Continued)

(58) Field of Classification Search
CPC ..................................................... H01M 2/206
See application file for complete search history.

(56) References Cited

U.S. PATENT DOCUMENTS

2007/0218353 A1* 9/2007 Straubel ............... B60L 3/0046
429/120
2008/0193830 A1* 8/2008 Buck ................... H01M 2/1077
429/120
(Continued)

FOREIGN PATENT DOCUMENTS

CN       102055003 A      5/2011
CN       202423398 U      9/2012
(Continued)

OTHER PUBLICATIONS

Machine translation of CN 104993187 A (Year: 2015).*

*Primary Examiner* — Robert S Carrico

(57) ABSTRACT

A solid-state polymer lithium battery pack and a preparation method therefor are provided. The lithium battery pack includes: single batteries (1), connecting sleeve members (2), electric cables (3), a battery box (4) and a pouring sealant, and has functions of power supply, power storage and multiple charging/discharging. The preparation method includes: connecting a plurality of single batteries in series by means of connecting sleeve members (2) to form combined batteries; connecting a plurality of combined batteries in series to form a lithium battery pack; and finally, assembling the lithium battery pack into a battery box (4), filling a pouring sealant inside the battery box by means of a sealant pouring process for fixing the single batteries (1) and internal electric cables (3), and discharging air in the battery box (4), so that a final solid-state polymer lithium battery pack is obtained.

4 Claims, 19 Drawing Sheets

(51) Int. Cl.
*H01M 2/20* (2006.01)
*H01M 10/0565* (2010.01)
*H01M 2/10* (2006.01)
*H01M 2/08* (2006.01)
*H01M 10/04* (2006.01)
*H01M 10/48* (2006.01)
*H01M 2/02* (2006.01)
*H01M 10/42* (2006.01)
*H01M 10/44* (2006.01)

(52) U.S. Cl.
CPC ......... *H01M 2/1077* (2013.01); *H01M 2/206* (2013.01); *H01M 10/0459* (2013.01); *H01M 10/0565* (2013.01); *H01M 10/0585* (2013.01); *H01M 10/486* (2013.01); *H01M 2/021* (2013.01); *H01M 2/0212* (2013.01); *H01M 2/0217* (2013.01); *H01M 10/425* (2013.01); *H01M 10/446* (2013.01)

(56) References Cited

U.S. PATENT DOCUMENTS

| | | | |
|---|---|---|---|
| 2012/0295150 A1* | 11/2012 | Gao | H01M 2/021 429/158 |
| 2013/0045409 A1* | 2/2013 | Schroeter | H01M 2/206 429/120 |
| 2013/0171486 A1* | 7/2013 | Joye | H01M 2/1072 429/98 |
| 2013/0288083 A1 | 10/2013 | Sweet land | |
| 2016/0020446 A1 | 1/2016 | Zheng | |
| 2017/0155104 A1* | 6/2017 | Yoneda | H01M 2/0237 |

FOREIGN PATENT DOCUMENTS

| | | |
|---|---|---|
| CN | 103227347 A | 7/2013 |
| CN | 203774395 U | 8/2014 |
| CN | 104993187 A | 10/2015 |

\* cited by examiner

US 10,693,180 B2

SOLID-STATE POLYMER LITHIUM BATTERY PACK AND PREPARATION METHOD THEREOF

CROSS REFERENCE OF RELATED APPLICATION

This is a U.S. National Stage under 35 U.S.C. 371 of the International Application PCT/CN2016/000379, filed Jul. 12, 2016, which claims priority under 35 U.S.C. 119(a-d) to CN 201610305852.0, filed May 10, 2016.

BACKGROUND OF THE PRESENT INVENTION

Field of Invention

The present invention relates to a lithium battery pack, and more particularly to a solid-state polymer lithium battery pack and a preparation method therefor.

Description of Related Arts

As the complexity of spacecraft operation increases, the power requirements of the spacecraft have also been on the rise, and thus higher demands have also been placed on the power subsystem of the spacecraft.

In the conventional arts, the modern spacecraft mainly adopts a solar array as a basic energy source to convert the solar radiation energy into energy through a photoelectric effect, and then battery is utilized to store energy to supply power to the spacecraft system and its payload. Thus, battery is an important part of a spacecraft power sub-system.

However, the weight of the battery is heavy and the volume thereof is bulky, which is not capable of meeting the needs of lightweight and compact size of the spacecraft.

Lithium-ion battery is an excellent secondary battery (rechargeable battery), with the advantages of large energy density, high average output voltage, small self-discharge, large output power and long service life. In addition, the lithium-ion battery has the following advantages: excellent cycle performance, fast charge and discharge, high charge efficiency; wide operating temperature range of up to −20° C. −60° C., so he lithium-ion battery has the potential in aerospace applications.

However, since the space environment of spacecraft flying in orbit is near vacuum, if the conventional solid-state lithium-ion battery is directly applied to space, it is not capable of meeting the requirements of spacecraft in terms of insulation, reliability, air tightness and volume; meanwhile the conventional solid-state lithium-ion battery has the problem of poor vacuum adaptability.

SUMMARY OF THE PRESENT INVENTION

In view of the defects in the conventional arts, the present invention provides a solid-state polymer lithium battery and a preparation method therefor, which can effectively solve the above problems.

The technical solution adopted by the present invention is as follows.

The present invention provides a solid-state polymer lithium battery pack, comprising: single batteries (1), connecting sleeve members (2), electric cables (3), a battery box (4) and pouring sealant;

wherein the single batteries (1) are high-specific-power solid-state polymer lithium-ion batteries composed of a lithium cobalt oxide positive electrode, a graphite negative electrode, a polymer separator, an aluminum alloy positive tab, a nickel-copper alloy negative tab and an Al compound packing film;

a plurality of the single batteries (1) are connected in series by a screw connection manner with the connecting sleeve members (2) to form assembled batteries (6);

a plurality of the assembled batteries (6) are connected in series to form a lithium battery pack (7);

and finally the lithium battery pack (7) is put into the battery box (4) made of a composite material, a potting process is utilized to fill the battery box (4) with sealant having good insulation and thermal conductivity, so as to fix the single batteries (1) and the electric cables (3) inside and discharge air in the battery box (4) to obtain the solid-state polymer lithium battery pack finally.

Preferably single batteries (1) have a laminated structure inside, which comprises multiple layers of a separator, a positive pole piece and a negative pole piece; wherein the positive pole piece is formed by synthesizing paste utilizing main active materials, conductive agent and adhesive agent; wherein the main active materials comprise: lithium cobalt oxide ($LiCoO_2$), lithium iron phosphate ($LiFePO_4$) and ternary material (NCA, NCM); the conductive agent comprises: acetylene carbon black, superconducting carbon black and graphite; and the adhesive agent is polyvinylidene difluoride homopolymer or homopolymer of polyvinylidene difluoride and fluorine-containing vinyl monomer. The paste is filmed and then double-sided heat-compounded on a perforated aluminum foil for collecting fluid, dried, grinded, laser sliced to prepare a positive pole piece; negative electrode is made of carbon material (graphite) as the main active material and conductive agent (acetylene black, superconducting carbon black), binder (vinylidene fluoride homopolymer or partial Vinyl fluoride and fluorine-containing vinyl monomer copolymer) synthesis of paste, film, double-sided thermal copper foil (current collector), by drying, rolling, laser chip prepared negative; the diaphragm, the main body is made of vinylidene fluoride homopolymer or vinylidene fluoride and fluorine-containing vinyl monomer copolymer; the entire body of the single batteries are in a dry state, energy density of the single batteries 1 is greater than 180 Wh/kg, battery capacity of the single batteries is not less than 10 Ah, and a rated voltage thereof is 4.2V, each of the single batteries is a rectangular structure with a size of 132 mm×87 mm×9 mm and a weight of less than 220 g.

Preferably, a formula of the lithium cobalt oxide is $LiCoO_2$, a formula of the lithium iron phosphate is $LiFePO_4$ and a formula of the ternary material is NCA and NCM); while preparing a positive electrode of the single batteries, the conductive agent is acetylene carbon black, superconducting carbon black or graphite; while preparing the negative electrode, a conductive agent is acetylene carbon black or superconducting carbon black; while preparing the positive electrode and the negative electrode, an adhesive agent is polyvinylidene difluoride homopolaymer or homopolaymer of polyvinylidene difluoride and fluorine-containing vinyl monomer.

Preferably, the battery box (4) comprises a battery box bottom (4-1) and a battery box cover (4-2);

wherein the battery box bottom (4-1) is made of M40 carbon fiber laminated composite material, wherein a laminated manner is [0/90/±45]s, a wall thickness is 1.0 mm; a shape size of the battery box bottom (4-1) is 297 mm×277 mm×19 mm;

a material and a laminated manner of the battery box cover (4-2) are identical to the battery box bottom (4-1); a wall thickness thereof is 1.0 mm, a shape size thereof is 300 mm×280 mm×20 mm;

a cabling hole (4-3) for a positive line of the battery charging/discharging, a cabling hole (4-4) for a negative line of the battery charging/discharging, and a cabling hole (4-5) for a voltage detection line, a cabling hole (4-6) for a ground wire, a cabling hole (4-7) for a temperature sensor wire, a plastic injection hole 4-8 and a vent hole 4-9 are opened on a side wall of the battery box and on corresponding positions of the bottom and the cover of the battery box;

both the positive line of the battery charging/discharging and the negative line of the battery charging/discharging can be utilized for charging and discharging. In addition, the circuit is in redundancy design, that is, both the positive lien and the negative line adopt double-point double-wire to ensure safety;

the voltage detection line is used for detecting a voltage signal of the single battery, wherein the number of the positive lines is identical to the number of the single batteries; and the positive lines and the single batteries are respectively connected to the positive electrodes of each single battery, and negative electrodes of each single battery share a negative line;

the temperature sensor is provided inside the solid-state polymer lithium battery, and a lead wire of the temperature sensor is led out through the temperature sensor wire cabling hole (4-7) for monitoring internal temperature of the battery pack.

Preferably, each of the single batteries (1) comprises a single battery body and a positive tab and a negative tab disposed on a side surface of the single battery body; fastening holes are respectively provided on the positive tab and the negative tab; the fastening holes are used for screw connection with the connecting sleeve member (2), so as to connect each of the single batteries in series.

Preferably, the connecting sleeve members (2) comprise: connection straps (8), insulating spacers (9) and fasteners (10);

wherein the connection straps (8) is prepared by machine-shaping a copper material and silver plating, comprising: an A-shaped connection straps (8a), a B shaped connection strap (8b), a C-shaped connection strap (8c), a D-shaped connection strap (8d), an E-shaped connection strap (8e) and an F-shaped connection strap (8f);

the insulating spacers (9) is made of a material of polyimide comprising: an A-shaped insulating spacer (9a), a B shaped insulating spacer 9b and a C-shaped insulating spacer (9c);

the fasteners (10) are made of stainless steel material comprising: fastening screws, nuts, flat washers and spring washers;

the connecting sleeve members (2) comprise four types: an A-type connecting sleeve member (2a), a B-type connecting sleeve member (2b), a C-type connecting sleeve member (2c), and a D-type connecting sleeve member (2d);

wherein the A-type connecting sleeve member (2a) is obtained by installing two A-shaped connection straps and four fastening screw onto of a first A-shaped insulating spacer;

the B-type connecting sleeve member (2b) is obtained by installing one A-shaped connection strap, one B-shaped connection strap and 3 fastening screws onto a second A-shaped insulating spacer;

the C-type insulating spacer (2c) is obtained by installing a first fastening screw, a first F-shaped connection strap and a first E-shaped connection strap onto a first side of a C-shaped insulating spacer; and installing a second fastening screw, a second F-shaped connection strap and a second E-shaped connection strap onto a second side of the C-shaped insulating spacer (2c);

the D-type connecting sleeve member (2d) is obtained by installing a C-shaped connection strap, a D-shaped connection strap, three F-shaped connection straps and a fastening screw onto a B-shaped insulating spacer.

The present invention further provides a method for preparing a solid-state polymer lithium battery pack, comprising steps of:

step (1) selecting single batteries comprising: performing single battery cycle test on multiple single batteries to remove unqualified single batteries to obtain qualified single batteries;

step (2) matching the single batteries (1):

for the qualified single batteries selected in the step (1), setting index matching requirements between the single batteries, matching to obtain a plurality of single battery assembles capable of meeting the index matching requirements, wherein each the single battery assembles contains required numbers of the single batteries;

step (3) cleaning components:

the connection straps (8), the insulating spacer (9), the fastener (10) and protective ring are cleaned by an ultrasonic cleaner, followed by washing with water, deionized water and absolute ethanol, and then airing on a filter paper;

step (4) treating the battery box (4) which comprises a battery box bottom (4-1) and a battery box cover (4-2) comprising steps of:

after wiping an inside of the battery box (4) with absolute ethanol, adhering the conductive copper foil to the internal side wall surface of the battery box bottom (4-1), and then installing the protective coil on a corresponding slot position of the battery box bottom (4-1), and curing for 24 hours at a room temperature; then pouring a certain amount of bottom sealant into the battery box bottom (4-1) and the battery box cover (4-2), and then putting into a vacuum box, evacuating to a pressure of not less than −0.09 MPa, for a time of not less than 15 min, repeating evacuating for 2 or 3 times until no bubble is within the sealant; finally, putting an insulating strip into the battery box bottom (4-1) and the battery cover (4-2), allowing pouring sealant to completely cover the insulating strip, and fixing the insulating strip with a fixture to make the pouring sealant naturally flow; then, heating and curing the battery box bottom (4-1) and the battery box cover (4-2) with the sealant filled wherein a temperature is control at a range of 60° C.±5° C., heating time is 6 hours; then cooling naturally;

step (5) preparing lithium battery pack (7):

for the single battery assembles matched in step (2), coating a protective film a surface of each single battery in the single battery assemble; punching on a preset position on a positive tab and a negative tab of each of the single battery with a punch fixture;

then processing wire cutting, stripping and tinning on installing wires, and processing baking treatment on the connection straps (8); after the processing, welding the connection straps (8) and mounting wires, and finally, installing the connection straps (8), the insulating spacer (9) and the fastener (10) of the wires by welding, assembling a number of the single batteries into a lithium battery pack (7);

step (6) pouring lithium battery pack step (6.1) preparing multi-component organic silica gel into pouring sealant according to a certain preparation process;

step (6.2) pre-pouring the bottom of the battery box, that is: pouring a certain dose of pouring sealant into the bottom the battery box (4-1);

afterwards, putting the lithium battery pack (7) on the battery box bottom pre-poured, bundling wire harness of the lithium battery pack (7), and fixing cables and the binding line buckle with GD 414 glue;

then carrying out pre-seal pouring, that is: adding the pouring sealant to the battery box bottom (4-1) until a height of a sealant layer reaches one half of a thickness of an upper battery layer;

step (6.3) after placing the battery box bottom (4-1) disposed in the lithium battery pack (7) into a vacuum box and evaluating until no bubbles are observed in the sealant;

step (6.4) then curing adhesive under a room temperature to prepare sealant for use;

step (6.5) polishing sealing surfaces of the battery box bottom (4-1) and the battery box cover (4-2), cleaning, coating with sealant, and then covering the battery box cover (4-2) to the battery box bottom (4-1), and positioning and curing with positioning fixture;

finally, pouring sealant after sealing comprising: pouring sealant again via an injection hole punched on a side surface of the battery box cover until pouring sealant overflows from observation holes and vent holes, curing to complete sealant pouring;

step (7) testing lithium battery pack: testing performance of the lithium battery pack obtained in step (6) under a room temperature to confirm that the lithium battery pack meets requirements.

Preferably, the step (1) performing single battery cycle test on multiple single batteries comprises:

respectively performing single battery cycle test, single battery charge retention capability measurement, open-circuit voltage and internal impedance test on a plurality of alternative single batteries, so as to remove unqualified single batteries; wherein the single battery charge retention capability measurement comprises: charge sustaining voltage, self-discharging rate, and recoverable capacity measurements;

wherein before starting the single battery charge retention capability measurement, shelf time of the single batteries at room temperature is not less than 28 days, wherein the shelf time is calculated from an end of a single battery cycle;

wherein in step (2), the index matching requirement comprises index matching requirements of a charge retention voltage difference, a self-discharge rate difference, a recoverable capacity difference, and an internal impedance difference.

Preferably, in the step (6.1), the pouring sealant is GN522 organic silica gel; the GN522 organic silica gel is mainly composed of methyl hydrogen silicone oil and methyl vinyl silicone oil containing catalyst; wherein the methyl hydrogen silicone oil is denoted as an M component and the methyl vinyl silicone oil containing catalyst is denoted as an N component, wherein the method for preparing a solid-state polymer lithium battery pack specifically comprises steps of:

(a) according to a sealant preparation amount, selecting suitable dispensing container and stirring rod, weighing sealant preparation containers with an electronic balance, and then resetting;

(b) according to sealant preparation amount, slowly pouring the M component of GN522 organic silica gel into a center of a bottom of the dispensing container and weighing;

(c) calculating the dosage according to a weight ratio of M component and N component M:N=1:1;

(d) slowly pouring the N component onto a center of a top of the M component in the dispensing container and monitoring the electronic balance until a weight of the N component meets requirements;

(e) inserting the stirring rod into a part of the M component without the N component being poured down, and starting stirring; wherein during stirring, be careful to keep the stirring rod moving under a surface of the sealant liquid all the time, and avoid a phenomenon that air is brought into the sealant and a large number of bubbles emerges, and the stirring is completed in 5 minutes;

(f) putting the sealant prepared in a vacuum box, vacuuming until a holding pressure is not less than −0.09 MPa, a time is not less than 15 min, allowing repeated vacuuming 2-3 times until no bubbles are observed in the sealant.

Preferably, the step (5) of welding the connection straps (8) and mounting wires, and finally, installing the connection straps (8), the insulating spacer (9) and the fastener (10) of the wires by welding, assembling a number of the single batteries into a lithium battery pack (7) specifically comprises:

(a) respectively passing two screws at a lower end of a first A-type connecting sleeve member (2a) through a negative electrode of the a first single battery and a positive electrode of a second single battery; in such a manner that the negative electrode of the first single battery and the positive electrode of the second single battery are connected in series; then connecting and fastening with two F-shaped connection straps (8f), two flat washers, two spring washers and two nuts;

(b) again in an identical way, connecting a negative electrode of a second single battery and a positive electrode of a third single battery in series by a lower end of a second A-type connecting sleeve member (2a) or a B-type connecting sleeve member (2b);

(c) connecting a positive electrode of a fourth single battery with a negative electrode of a fifth single battery in series via an upper end of the first A-shaped connecting sleeve member (2a) in the step (a) by two F-shaped connection straps (8f), two flat washers, two spring washers and two nuts;

(d) connecting a positive electrode of a fifth single battery with a negative electrode of a fifth single battery in series via an upper end of the second A-shaped connecting sleeve member (2a) or the B-type connecting sleeve member (2b) in the step (b) by two F-shaped connection straps (8f), two flat washers, two spring washers and two nuts;

(e) connecting and fastening a negative electrode of the fourth single battery with a positive electrode of the first single battery with a C-type connecting sleeve member, in such a manner that the first assembled battery 1 is obtained;

(f) repeating the steps (a)-(e) to obtain a next assembled battery; then connecting a plurality of assembled batteries (8) obtained in series with a D-type connecting sleeve member (2d), and multiple flat washers, spring washers and nuts.

Preferably, the step (6.2) pre-pouring the battery box bottom with sealant specifically refers to pouring a certain amount of the pouring sealant into the battery box bottom, after leveling placing in a vacuum box to evacuate to a pressure of not less than −0.09 MPa holding pressure, an evacuating time of not less than 15 min, allowing repeated vacuum for 2 to 3 times until no bubble is within the pouring sealant;

in the step (6.2), the glue before sealing specifically refers to: after putting the lithium battery pack (7) in the battery box bottom, firstly setting up the upper-layer battery by a fixture, slowly adding the pouring sealant to the battery box bottom, controlling a height of the sealant-pouring just over a lower-layer battery until the pouring sealant slowly levels out and covers a surface of the lower-layer battery, and then removing the fixture to fall the upper-layer battery down, continuing to pour the pouring sealant until a height of the pouring sealant reaches a half of a thickness of the upper-layer battery;

the step (6.3) specifically refers to: putting the lithium battery pack into a vacuum box, evacuating to −0.08 MPa±0.005 MPa holding pressure, an evacuating time is not less than 15 min, allowing repeated vacuum for 2 or 3 times until no bubbles are in the pouring sealant;

in the step (6.5), the pouring sealant after sealing specifically comprises steps of: pre-punching an injection hole and a vent hole on a front surface of the battery box cover, covering the battery box with a protective layer; putting the battery box in a sealant pouring tool, wherein the injection hole and the vent hole on the battery box face upward, then slowly inserting an injection pipe into the injection hole, injecting a dose of the pouring sealant prepared into the battery box through the injection pipe by a disposable syringe; and putting the lithium battery pack into a vacuum box, evacuating to a −0.065 MPa±0.005 MPa holding pressure for not less than 30 min; then repeating injecting sealant and evacuating until no bubbles overflow and a small amount of the pouring sealant exists in the injection pipe and an exhaust pipe; then taking the lithium battery pack and the sealant pouring tool out of the vacuum box; placing the lithium battery pack at an angle of 45° to a ground and curing for not less than 14 days.

Preferably, the performance test of the lithium battery pack in the step (7) comprises: measuring discharge data of the lithium battery pack, checking a discharge capacity, and measuring a battery voltage after charging and discharging.

The solid-state polymer lithium battery pack and the preparation method therefor provided by the invention have the following advantages:

The solid-state polymer lithium battery provided by the invention has good insulation property, wide working temperature range, long service life, high reliability, good mechanical properties of shock impedance/vibration/noise and good adaptability to vacuum environment, and is suitable for spacecraft application. The present invention can also be adopted in devices with various requirements for direct-current voltage output. In addition, the present invention also has the advantages of regular shape, compact size and the like, which facilitates the construction of a multi-functional structure inside the embedded structures.

DETAILED DESCRIPTION OF THE PREFERRED EMBODIMENT

In order to make the technical problems, technical solutions and beneficial effects solved by the present invention more clear and comprehensible, the present invention is further illustrated in detail below combined with the accompanying drawings and preferred embodiments. It should be understood that the preferred embodiments described herein are only for explaining the present invention, and are not intended to limit the present invention.

In view of the technical problem that the conventional solid-state lithium batteries are not capable of being applied to a spacecraft flying in a vacuum environment well, the present invention provides a solid-state polymer lithium battery pack which is suitable for vacuum conditions and easy to be embedded into internal structure.

The solid-state polymer lithium battery pack provided by the present invention has beneficial effects as follows.

(1) According to requirements of the voltage design, the specifications including the rated capacity and rated voltage and the amount of the internal single batteries in the solid polymer lithium battery pack can be specifically selected, so as to achieve different performance indexes. The solid-state polymer lithium battery pack has the advantages of flexible and convenient assembly.

(2) In the present invention, a plurality of connection packages is used to connect a plurality of single batteries in series by using a screw connection manner. The invention has the characteristics of flexible connection modes and enables dexterous combination of any multiple batteries to realize different voltage outputs, and meanwhile the impact of soldering heat production on lithium battery seal is decreased, and the difficulties of aluminum to nickel treatment are overcome.

(3) By filling the inside of the lithium battery box with pouring sealant, not only the lithium battery is protected and dissipated but also the present invention is suitable for a vacuum application.

1. Internal Structure of Single Battery

The specific construction of the single battery applied in the preferred embodiment will be described below.

Figure 2:
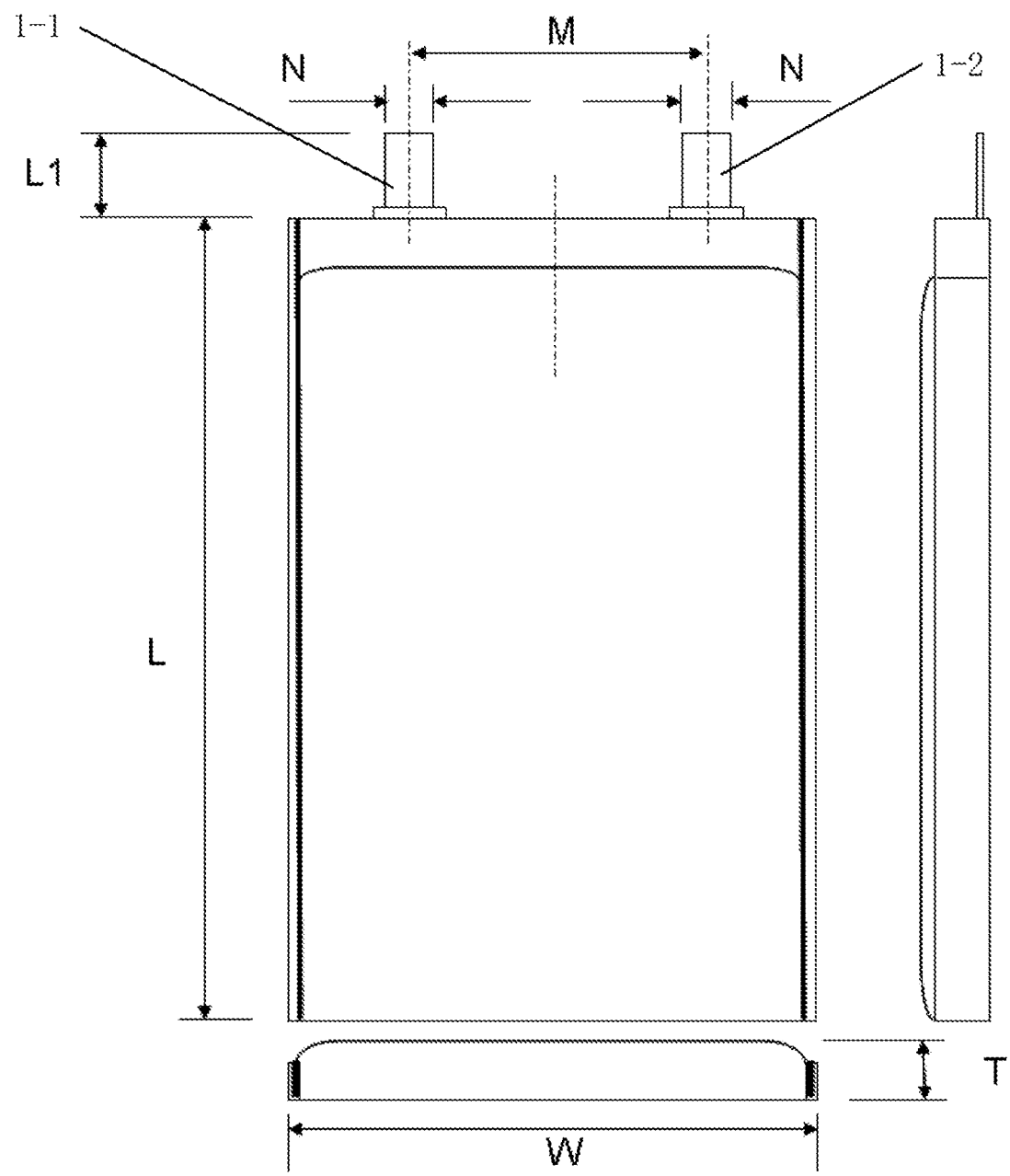
FIG. 2 is a design sketch view of a single battery; wherein 1-1 is a positive tab; 1-2 is a negative tab.
Figure 3:
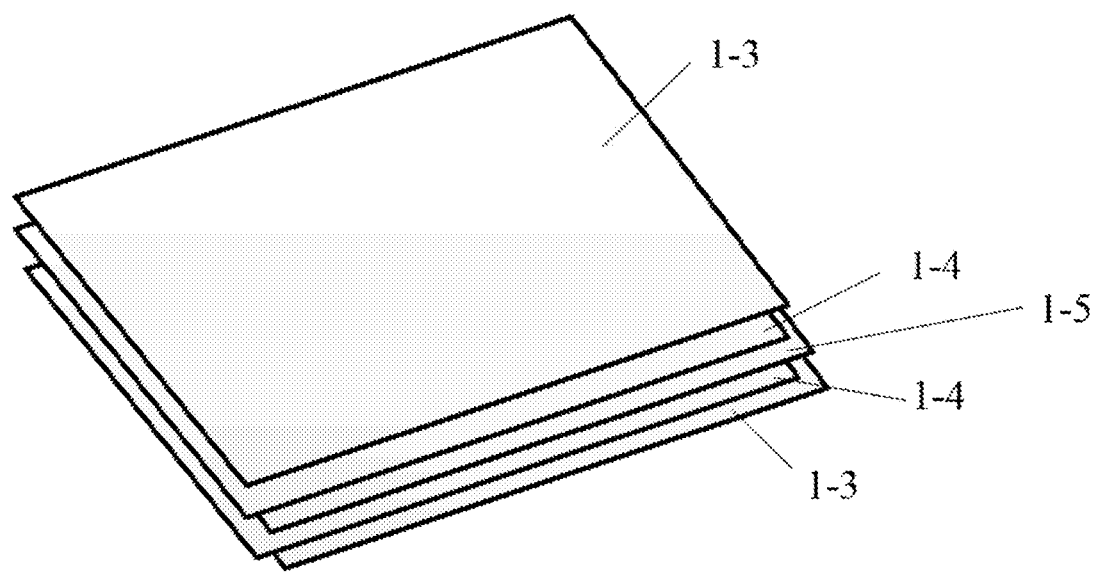
FIG. 3 is a schematic view of an internal laminated structure of the single battery; wherein 1-3 is a positive pole piece; 1-4 is a negative pole piece.

A single battery 1 adopts high specific power solid-state polymer lithium battery which contains no free liquid and the entire battery is in a dry state, so as to prevent dangers of electrolyte leakage, combustion and explosion. Energy density of the single battery 1 is greater than 180 Wh/kg, which is far greater than energy density of 50-70 Wh/kg of the nickel-metal hydride battery currently utilized in space and energy density of 100-130 Wh/kg of the liquid lithium-ion battery with steel shell. Battery capacity of the single battery is not less than 10 Ah, and a rated voltage thereof is 4.2V. According to size and structure forms of the multifunctional structure, the single battery is designed into a rectangular structure. As shown in FIG. 2, a size is 132 mm×87 mm×9 mm, and a weight is less than 220 g. Specific specifications parameters of the single battery 1 are as shown in Table 1, technical parameters of single battery 1 are as shown in Table 2, and main raw materials used in production are as shown in Table 3 below.

The solid-state polymer lithium battery has a laminated structure inside, which comprises multiple layers of a separator, a positive pole piece and a negative pole piece; wherein the positive pole piece is formed by synthesizing paste utilizing main active materials, conductive agent and adhesive agent; wherein the main active materials comprise: lithium cobalt oxide ($LiCoO_2$), lithium iron phosphate ($LiFePO_4$) and ternary material (NCA, NCM); the conductive agent comprises: acetylene carbon black, superconducting carbon black and graphite; and the adhesive agent is polyvinylidene difluoride homopolaymer or homopolaymer of polyvinylidene difluoride and fluorine-containing vinyl monomer. The paste is filmed and then double-sided heat-compounded on a perforated aluminum foil for collecting fluid, dried, grinded, laser sliced to prepare a positive pole piece; negative electrode is made of carbon material (graphite) as the main active material and conductive agent (acetylene black, superconducting carbon black), binder (vinylidene fluoride homopolymer or partial Vinyl fluoride and fluorine-containing vinyl monomer copolymer) synthesis of paste, film, double-sided thermal copper foil (current collector), by drying, rolling, laser chip prepared negative; the diaphragm, the main body is made of vinylidene fluoride homopolymer or vinylidene fluoride and fluorine-containing vinyl monomer copolymer; after punching the positive plate to set aside the light side, do not apply the active material, as the positive electrode leads for Welding positive electrode made of aluminum alloy material; same Like, after cutting the negative film set aside the light side, do not apply the active material, as the negative electrode leads for welding nickel-copper alloy material made of negative tabs. Die-cutting electrode surface using the electrode surface powder compacting equipment, can ensure that the chip around the burr in an acceptable range, while ensuring that the electrode surface without dust, reduce the chance of battery short circuit. In addition, the surface of the battery shell coated aluminum-plastic composite protective film for protection.

Since the components of the battery are polymerized together by reprocessing, thermal compounding under 120° C.-140° C., so as to ensure the stability and consistency of the interface, so that the electrical properties and safety of lithium polymer battery are improved. In addition, the solid-state polymer lithium battery as a whole also has characteristics of a small size, light weight and etc.

TABLE 1

Specifications of the single battery

| Items | Descriptions | Size/mm |
|---|---|---|
| T | Thickness | $9.0_{-0.5}{}^{0}$ |
| W | Width | 87.0 ± 0.5 |
| L | Length | 132.0 ± 0.5 |
| L1 | Length of electrode plug | 12.0 ± 1.0 |
| M | Center distance of electrode plug | 47 ± 1.0 |
| N | Width of the electrode plug | 10 ± 0.5 |

TABLE 2

Main technical parameters of the single battery

| Numbers | Contents | Index Requirement | Notes |
|---|---|---|---|
| 1 | Minimum capacity | 10 Ah | 0.2 C5 A |
| 2 | Maximum capacity | 11 Ah | 0.2 C5 A |
| 3 | Energy density | 175 Wh/kg | |
| 4 | Batch to batch battery capacity deviation | ≤3% | 0.2 C5 A |
| 4 | Rated voltage | 4.2 V | |
| 5 | Factory voltage | 3.8~3.9 V | |
| 6 | Maximum charge cut-off voltage | 4.2 V | |
| 7 | Discharge cut-off voltage | 3.0 V | |
| 8 | Standard charge current | 0.2 C5 A | 2 A |
| 9 | Working discharge current | 0.67 C5 A | 6.7 A |
| 10 | Working discharge current | 0.5 C5 A | 5 A |
| 11 | Maximum discharge current | 1 C5 A | 10 A |
| 12 | Maximum pulse current | 2 C5 A | 20 A, ≤10 ms |
| 13 | Standard charging time | ≤6 h | 100% |
| 14 | Initial resistance | ≤4 mΩ | 4.2 V, AC1 KHz |
| 15 | Weight | ≤220 g | |
| 16 | Operating temperature | 10° C.~40° C. | Containing charge and discharge process |
| 17 | Storage life | 3 years | Under standard maintenance conditions |

TABLE 2-continued

Main technical parameters of the single battery

| Numbers | Contents | Index Requirement | Notes |
|---|---|---|---|
| 18 | High and low temperature capacity | | Meeting requirements of GJB6789-2009 on March 10 |
| 19 | Impact | | Meeting requirements of GJB6789-2009 on March 13 |
| 20 | Vibration | | Meeting requirements of GJB6789-2009 on March 12 |
| 21 | Short circuit | | Meeting requirements of GJB678912-2009 on March 12 |
| 22 | Overcharge | | Meeting requirements of GJB678916-2009 on March 16 |
| 23 | Overdischarge | | Meeting requirements of GJB678917-2009 on March 17 |
| 24 | Steady-state acceleration | | Meeting requirements of GJB678911-2009 on March 11 |
| 25 | Cycle life | ≥300次 (residual capacity ≥ 80%), 100% DOD, 1C5 A | |
| 26 | Battery package vacuum | <3000 Pa | |

TABLE 3

Main materials in production of the single battery

| Numbers | Name | Type specification | Factory | Notes |
|---|---|---|---|---|
| 1 | Cathode material | $LiCoO_2$ | Ba Maw | Produced in China |
| 2 | Anode material | Carbon material | BTR Nano Technology Co CMB | Produced in China |
| 3 | Electrolyte | Containing $LiPF_6$ | Beijing Chemical Reagent Research Institute | Joint venture |
| 4 | Separator adhesive | 2801 | Arkema | France |
| 5 | Aluminum composite film | 150 | Japan DNP | Japan |
| 6 | Electrode plug | Aluminum nickel-copper alloy | Baolong | Produced in China |

Relevant physical parameters of each component of the lithium-ion battery utilized in the single battery 1 are shown in Table 4.

TABLE 4

Relative parameters of each component of the battery

| Materials | Density g/cm³ | Elasticity modulus MPa | Poisson's ratio | Thickness μm |
|---|---|---|---|---|
| Cathode | 2.7 | $70 \times 10^3$ | 0.31 | 20 |
| Separator | 0.92 | 46.6 | 0.3 | 20 |
| Anode | 8.9 | $110 \times 10^3$ | 0.33 | 12 |
| Epoxy Resin | 1.2 | $3 \times 10^3$ | 0.3 | 25 |

2. Preparation of the Battery Box

Figure 4:
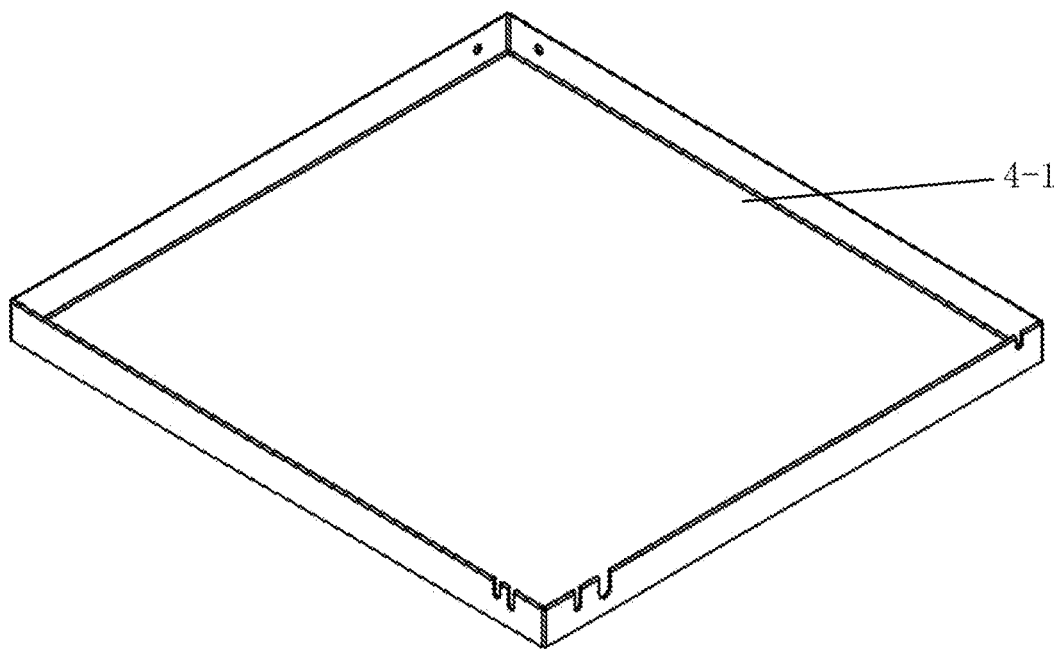
FIG. 4 is a stereo diagram of a bottom of a battery box.
Figure 5:
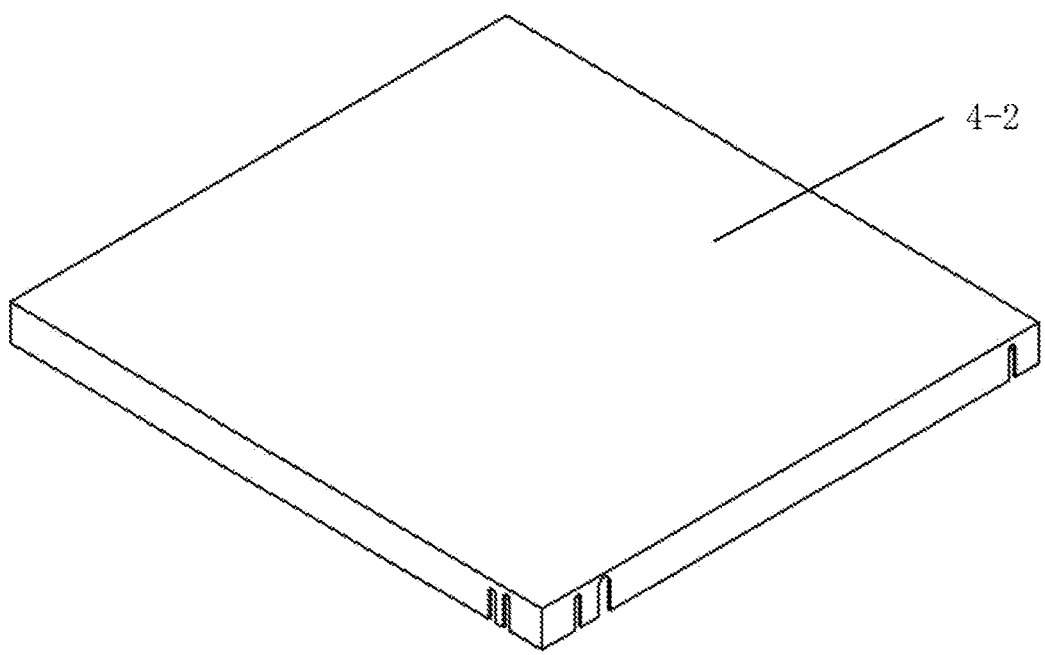
FIG. 5 is a stereo diagram of a cover of the battery box.

The battery box comprises a battery box bottom and a battery box cover which are integrated into a whole body by a sealant. An overall shape of the battery box 4 is a rectangular parallelepiped with a size of 300 mm×280 mm×20 mm and a wall thickness of 1.0 mm. As shown in FIG. 4, a size of the battery box bottom is 297 mm×277 mm×19 mm and a wall thickness thereof is 1.0. As shown in FIG. 5, a size of the battery box cover is 300 mm×280 mm×20 mm and a wall thickness thereof 1.0 mm.

Both the battery box bottom and the battery box cover are made of M40 carbon fiber laminated composite material, wherein a laminated manner is [0/90/±45]s.

Figure 6:
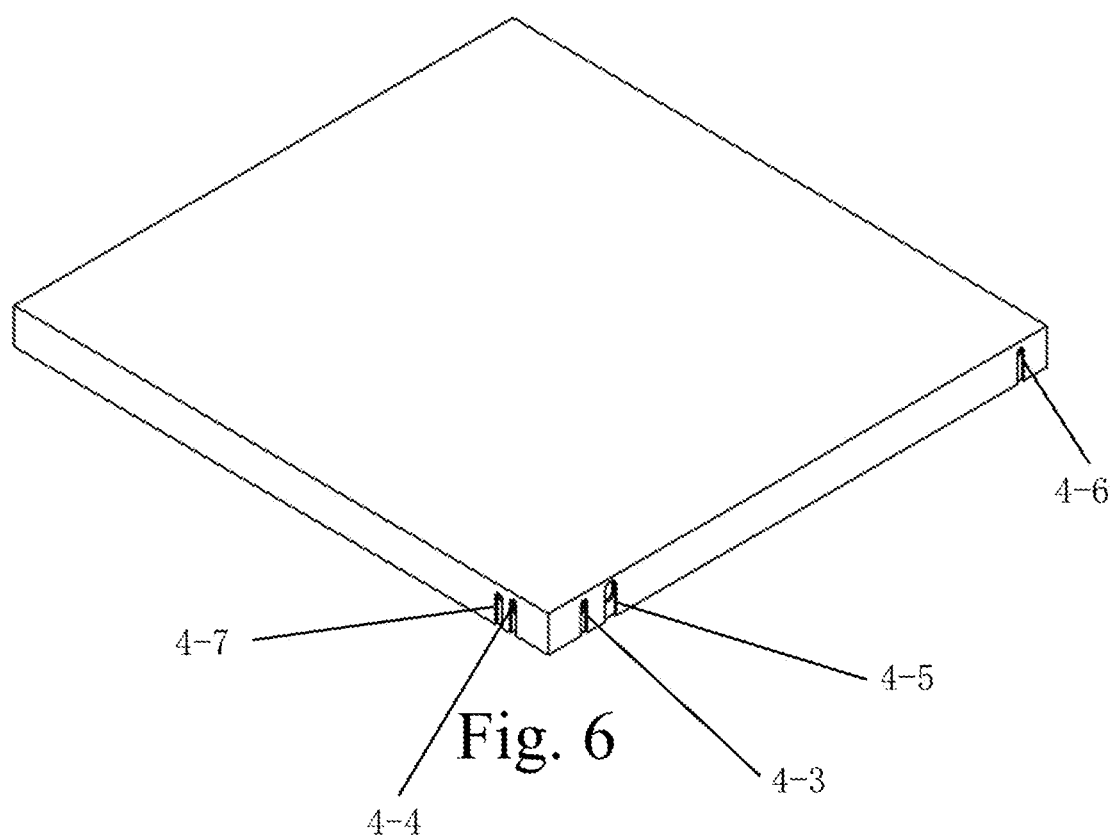
FIG. 6 is a stereo diagram of a whole battery at an angle.
Figure 7:
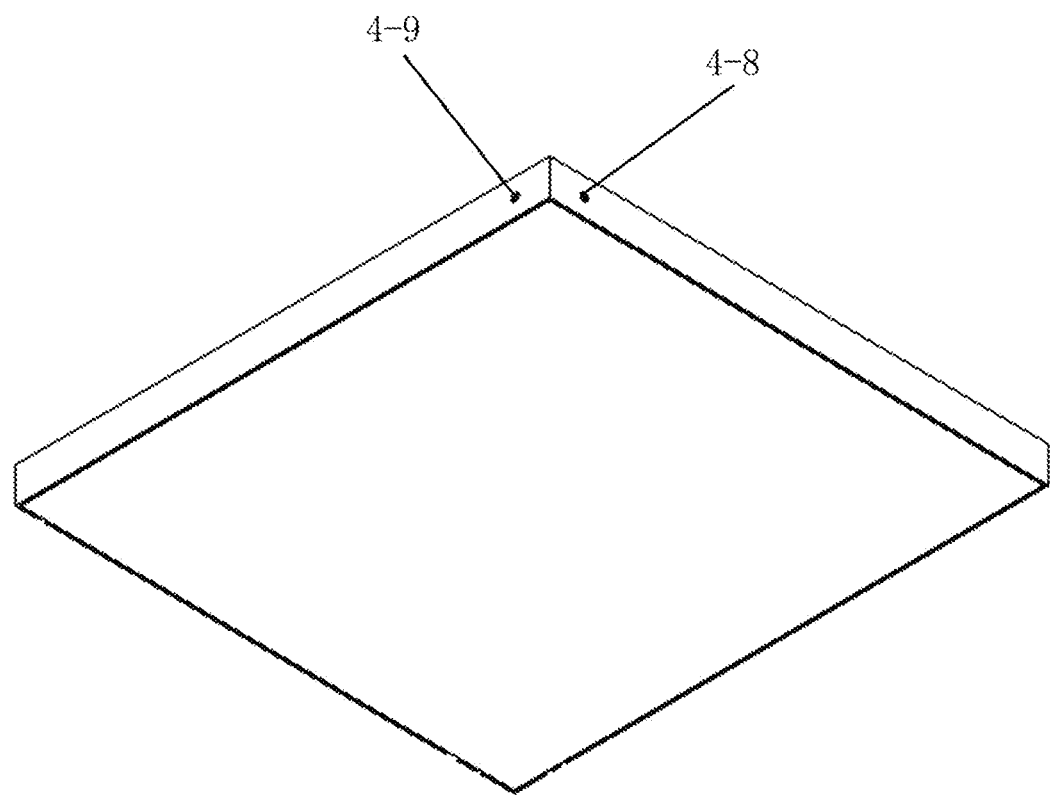
FIG. 7 is a stereo diagram of the whole battery box at another angle.
Figure 8:
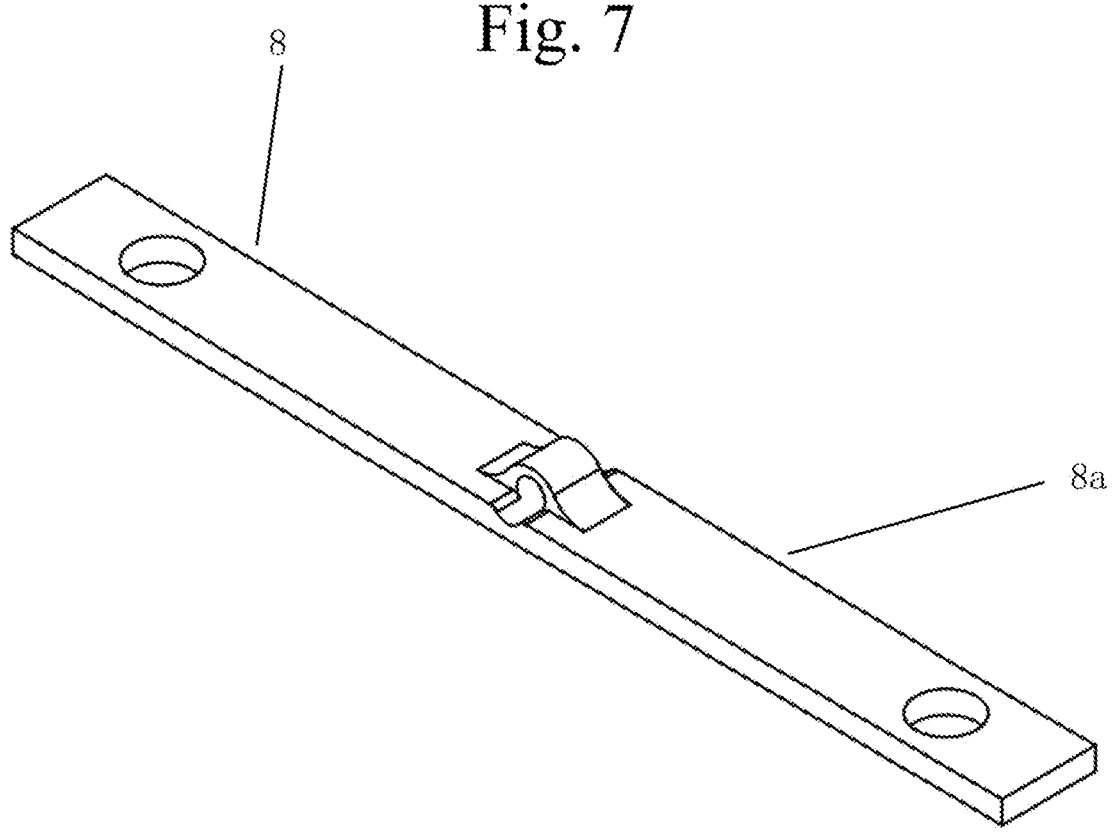
FIG. 8 is a structural schematic view of an A-shaped connection strap.
Figure 9:
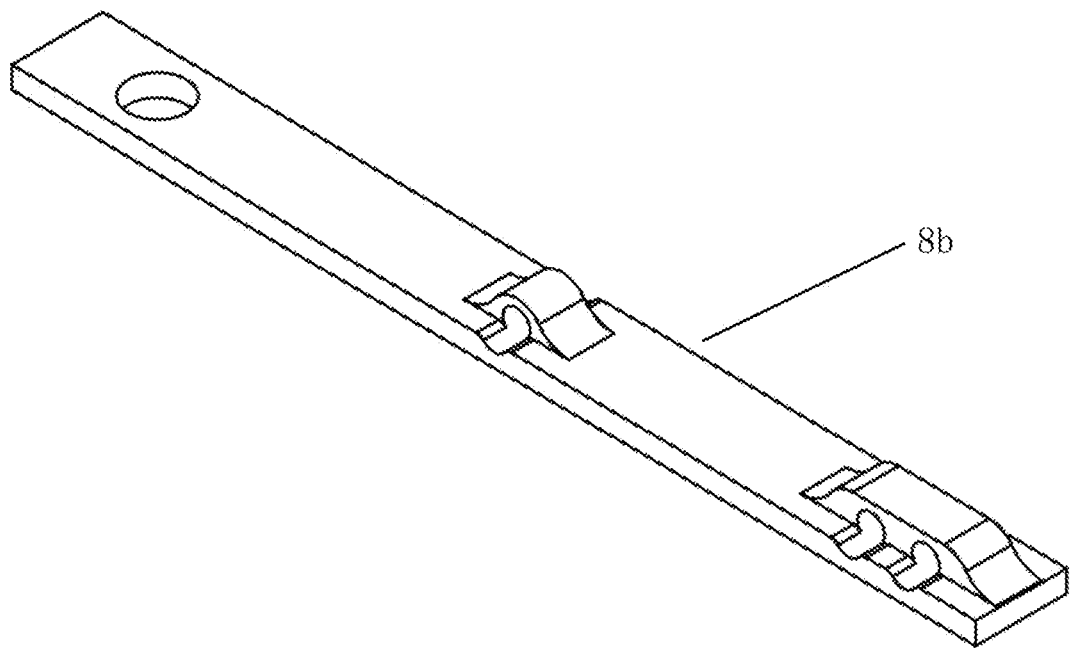
FIG. 9 is a structural schematic view of a B-shaped connection strap.
Figure 10:
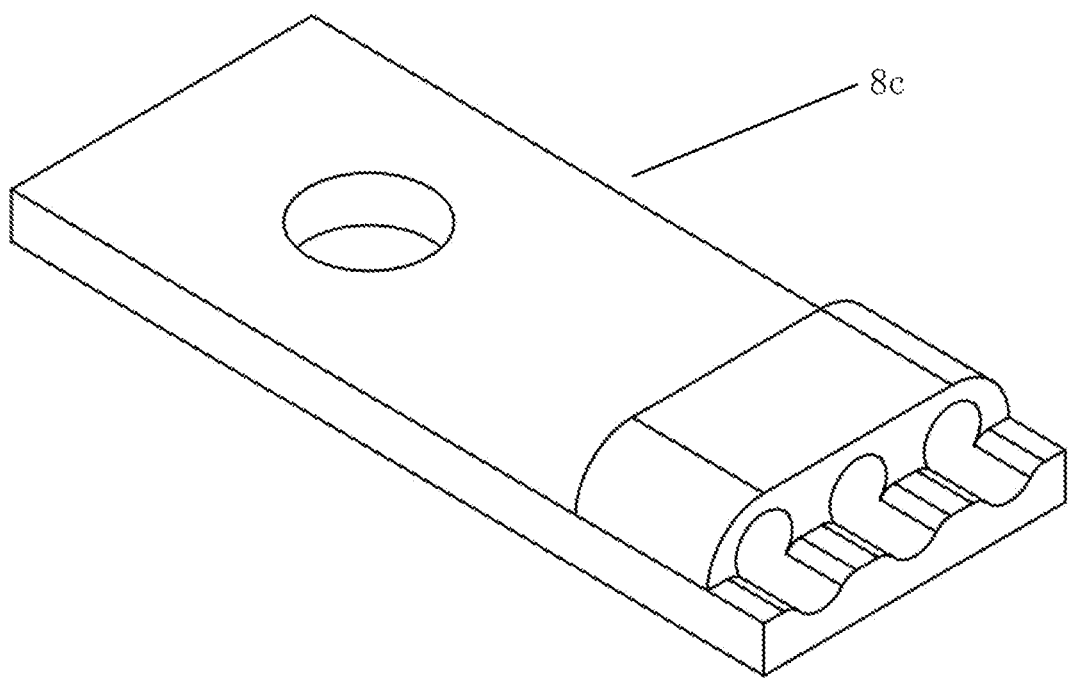
FIG. 10 is a structural schematic view of a C-shaped connection strap.
Figure 11:
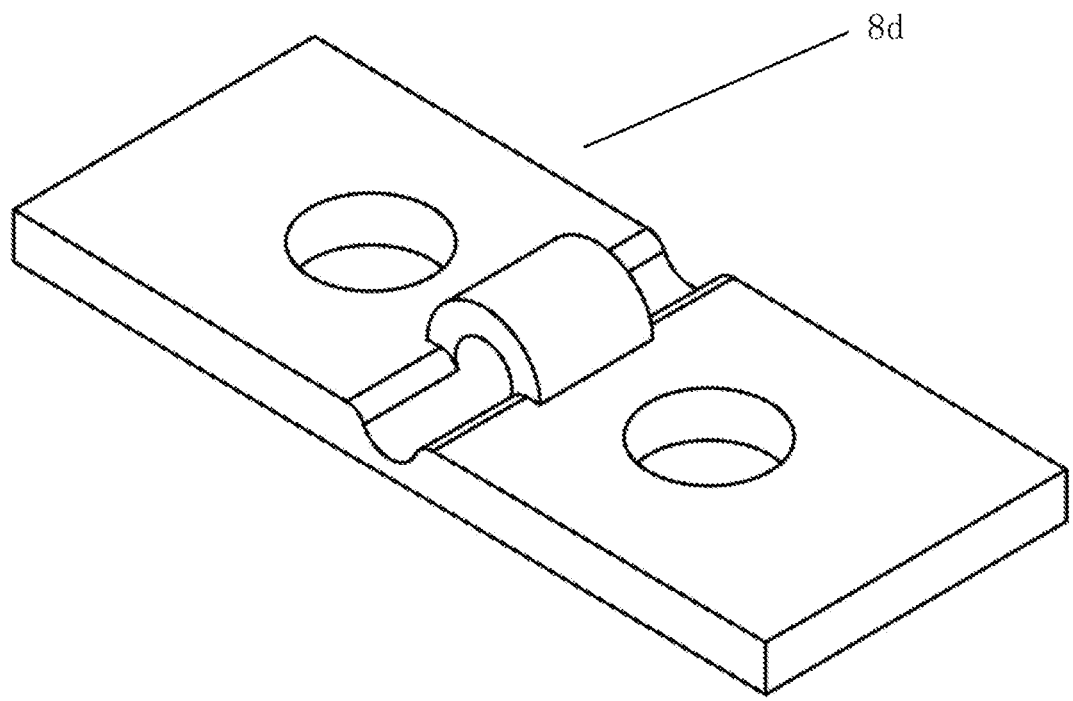
FIG. 11 is a structural schematic view of a D-shaped connection strap.
Figure 12:
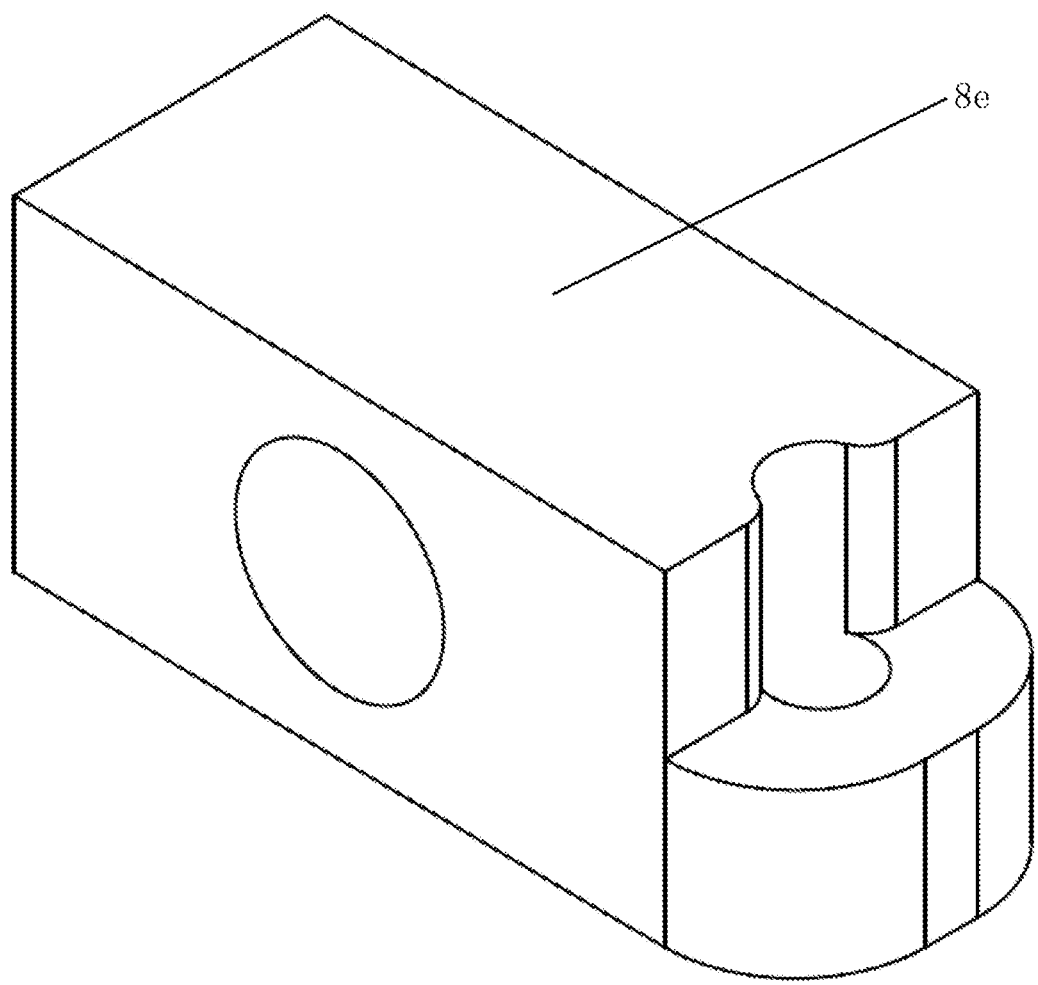
FIG. 12 is a structural schematic view of an E-shaped connection strap.
Figure 13:
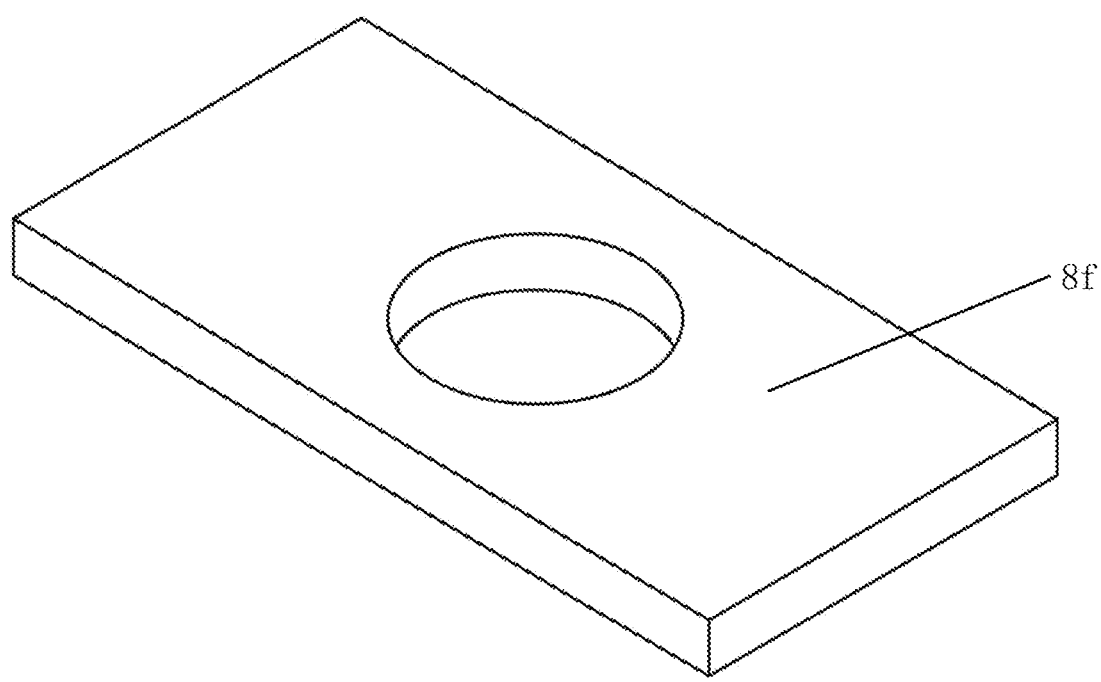
FIG. 13 is a structural schematic view of an F-shaped connection strap.

Referring to FIGS. 6 and 7, a cabling hole 4-3 for a positive line of the battery charging/discharging, a cabling hole 4-4 for a negative line of the battery charging/discharging, and a cabling hole 4-5 for a voltage detection line, a cabling hole 4-6 for a ground wire, a cabling hole 4-7 for a temperature sensor wire, a plastic injection hole 4-8 and a vent hole 4-9 are opened on a side wall of the battery box.

Both the positive line of the battery charging/discharging and the negative line of the battery charging/discharging can be utilized for charging and discharging. In addition, the circuit is in redundancy design, that is, both the positive lien and the negative line adopt double-point double-wire to ensure safety.

The voltage detection line is used for detecting a voltage signal of the single battery, wherein the number of the positive lines is identical to the number of the single batteries; and the positive lines and the single batteries are respectively connected to the positive electrodes of each single battery, and negative electrodes of each single battery share a negative line.

The temperature sensor is provided inside the solid-state polymer lithium battery, and a lead wire of the temperature sensor is led out through the temperature sensor wire cabling hole 4-7 for monitoring internal temperature of the battery pack.

3. Preparation Process of the Solid-State Polymer Lithium Battery Pack

A preferred embodiment of the present invention will be described below. In the preferred embodiment, the lithium battery pack is composed of 11 pieces of the single batteries connected in series and potted in the composite battery box with an insulating heat conductive silicone rubber. Positive and negative bus of the lithium battery pack directly leads from the battery box in a two-wire form. Meanwhile, 12 voltage detection lines are led out of the lithium battery pack. A thermistor is further added for temperature acquisition. In addition, conductive copper foils are adhered on both an internal side and an external side of the battery box an are grounded; wherein the conductive copper foils are fixed into bundle by a shrinkable tube and respectively led out of the battery box.

The specific process is as follows.

Step (1): Selecting Single Batteries

By measuring cycle test of the single batteries, 28-day charge retention of the single batteries, self-discharge rate, recoverable capacity, open-circuit voltage and internal impedance test, so as to reject unqualified batteries.

The specific measuring method is:

(1) Single Battery Cycle Test firstly, the single batteries comprising steps of: a) adjusting a location of a battery clamp on a battery performance tester for confirming to a size of the single batteries; b) mounting single batteries which are numbered onto the battery clamp;

then setting according to program of the Table. 5, followed by a single battery cycle test:

TABLE 5

Activation control program of the single batteries

| Numbers | Operating mode | Main parameters | Limiting condition | Cycle index |
|---|---|---|---|---|
| 1 | Standing | 5 min | — | Once |
| 2 | Constant current discharge | 4 A | Voltage limit 2.75 V | |
| 3 | Standing | 30 min | — | Three times |
| 4 | Constant current charging | 4 A | Voltage limit 4.2 V | |
| 5 | Constant current charging | 4.2 V | 0.1 A | |
| 6 | Standing | 10 min | — | |
| 7 | Constant current discharging | 4 A | Voltage limit 2.75 V | |
| 8 | Standing | 30 min | — | Once |
| 9 | Constant current charging | 4 A | Voltage limit 4.2 V | |
| 10 | Constant voltage charging | 4.2 V | 0.1 A | |
| 11 | Standing | Measuring voltage and internal impedance after being removed off the shells for 12 hours | end | |

(2) Charge Retention Measurement (2.1) Capacity Test a) after the cycle test, the single batteries are stood at room temperature for no less than 28 days which are calculated from the end of the single battery cycle test;

b) mounting the single batteries onto a battery clamp, program setting according to Table. 6;

TABLE 6

Control program of charge retention measurement single batteries

| Number | Operating mode | Main parameters | Limiting condition | Cycle index |
|---|---|---|---|---|
| 1 | Standing | Before rackin, measuring voltage and internal impedance for 10 min | — | Once |
| 2 | Constant current discharging | 4 A | Voltage limit 2.75 V | |
| 3 | Standing | 30 min | — | |
| 4 | Constant current charging | 4 A | Voltage limit 4.2 V | |

TABLE 6-continued

Control program of charge retention measurement single batteries

| Number | Operating mode | Main parameters | Limiting condition | Cycle index |
|---|---|---|---|---|
| 5 | Constant voltage charging | 4.2 V | 0.1 A | |
| 6 | Standing | 10 min | End | |
| 7 | Constant current discharging | 4 A | Voltage limit 2.75 V | |
| 8 | Standing | 30 min | — | |
| 9 | Charging | 4 A constant current charge for 1 h | End | | c) turning on a power of the battery performance tester, running the charge retention test control program, after 28 days, recording static voltage, internal impedance and discharge capacity;

d) removing the single batteries from the battery clamp after termination;

e) self-discharge rate=(1-5th discharge capacity/4th discharge capacity)*100%, which should not be more than 7%;

f) removing the single batteries fail to meet the requirements.

(2.2) Screening Rules after standing for 28 days, screening the single batteries according to items and standard operation according to Table 7, so as to remove unqualified batteries.

TABLE 7 screening items and standards of the single batteries

| Number | Test item | Judging standards |
|---|---|---|
| 1 | Charge maintain voltage | After standing for 28 days, open-circuit voltage drop of the single batteries is not exceeding 40 mV |
| 2 | Self-discharge rate | After standing for 28 days, self-discharge rate of the single batteries is not exceeding 7%. |
| 3 | Recoverable capacity | A sixth discharge capacity of the single batteries is equal to or greater than 9.8 Ah |
| 4 | Internal impedance | ≤4 mΩ |
| 5 | Internal impedance difference before and after charging | ≤0.5 mΩ |

(3) Voltage and Internal Impedance Test after charge retention capability test of the single batteries is completed and the single batteries are removed off shelves, respectively detecting and recording internal impedance and open-circuit voltage of the single batteries one by one by an internal impedance tester and a digital voltmeter; or detecting and recording the internal impedance and the open-circuit voltage by the internal impedance tester;

excluding unqualified batteries according to a standard that internal impedance of the single batteries should not be greater than 4 mΩ, and open-circuit voltage thereof should not be less than 3.75V;

Step (2): Matching Single Batteries

The step (2) matching single batteries comprises steps of: by measuring charge retention difference, self-discharge rate difference, recovery of capacity difference and internal impedance difference of the single batteries in 28 days, matching a total of 44 single batteries in 4 modules of each set of lithium batteries;

classifying the 44 single batteries into 4 groups in accordance with the 11 strings, grouping the single batteries according to the standards in Table 8;

TABLE 8

Battery grouping standards

| Charge retention voltage deviation | Self-discharge rate deviation | Recoverable capacity deviation | Internal impedance deviation |
|---|---|---|---|
| ≤20 mV | ≤3% | ≤0.2 Ah | ≤0.3 mΩ |

Step (3): Cleaning Components

The step (3) cleaning components comprises steps of: single battery processing: covering a protective coating on a surface of the single batteries and pre-positioned and punched on electrode lugs of the single batteries for electrical connection;

preparing lead wire and connection kit: processing and forming the connection kit adopting a copper material, wherein silver plating, wherein fasteners is made of stainless steel; nuts, flat washers and elastic gaskets are selected from aviation standard catalog of 694 factory; according requirements of the space for electronic wiring, the wire is performed with cutting, stripping, tinning and etc;

finally, cleaning a connection bar 8, an insulating spacer 9, a fastener 10 and a protection coil by an ultrasonic cleaner, after cleaning, respectively washing with clean water, deionized water and absolute ethanol followed by airing on filter paper.

Step (4): Processing the Battery Box 4

4.1: Preparing Pouring Sealant

The pouring sealant adopts GN522 organic silica gel manufactured by Sichuan Chenguang Chemical Research Institute as a raw material. The organic silica gel is mainly composed of methyl hydrogen silicone oil (M component) and methyl vinyl Silicone oil (N component), wherein the methyl hydrogen silicone oil (M component) is cross-linking agent of the organic silica gel, and the methyl vinyl silicone oil (N component) is a main component of the organic silica gel. Specific preparing method of the pouring sealant comprises steps of:

(a) according to a sealant preparation amount, selecting suitable dispensing container and stirring rod, weighing sealant preparation containers with an electronic balance, and then resetting;

(b) according to sealant preparation amount, slowly pouring the M component of GN522 organic silica gel into a center of a bottom of the dispensing container and weighing;

(c) calculating the dosage according to a weight ratio of M component and N component M:N=1:1;

(d) slowly pouring the N component onto a center of a top of the M component in the dispensing container and monitoring the electronic balance until a weight of the N component meets requirements.

(e) inserting the stirring rod into a part of the M component without the N component being poured down, and starting stirring; wherein during stirring, be careful to keep the stirring rod moving under a surface of the sealant liquidall the time, and avoid a phenomenon that air is brought into the sealant and a large number of bubbles emerges, and the stirring is completed in 5 minutes;

(f) putting the sealant prepared in a vacuum box, vacuuming until a holding pressure is not less than −0.09 MPa, a time is not less than 15 min, allowing repeated vacuuming 2-3 times until no bubbles are observed in the sealant;

An allowed operating time for preparing the potting sealant does not exceed 6 hours.

4.2: pre-pouring a bottom of the battery box, comprising:

pouring a certain dose of pouring sealant into the bottom of the battery box with 28 g~30 g; into a cover of the battery box with 23 g~25 g; and into a fixture of a positioning sealant block until full;

sending the bottom of the battery box, the cover of the battery box and the fixture of the positioning sealant block which are poured with the pouring sealant into a vacuum box; vacuumizing to a holding pressure of not less than −0.09 MPa, wherein a time is not less than 15 min, repeated vacuumizing for 2-3 times until there is no bubbles are observed in the sealant;

putting the bottom of the battery box and the cover of the battery box onto an operating platform; putting an insulation plate in a corresponding position where the pouring sealant is capable of completely covering the insulating plate, the bottom of the battery box and the cover of the battery box; fixing the insulating plate with a clamp, in such a manner that the pouring sealant is capable of leveling naturally; thermal curing the cover of the battery box and the positioning sealant block fixture; wherein a temperature is at a range of 60±5° C., a heating time is 6 h; natural cooling before use.

Step (5): Preparing a Lithium Battery Pack 7

5.1: protecting the surface of each monomer battery in the single battery pack and protecting a positive tab and a negative tab of the single battery pack by a punch fixture;

wherein a punching process comprises:

a) loosening the a wing nut of the punch fixture and putting a layer of epoxy laminated glass cloth panel into the positioning slot;

b) putting single batteries into the punch fixture and putting the positive tab into a fixture positioning groove smoothly, so as to achieve positioning punch;

c) pressing the epoxy laminated glass cloth panel on the positive lug, so as to prevent overlap on an edge of a hole when drilling, and tightening the wing nut;

d) punching by the punch fixture with power tools, wherein a hole diameter is at a range of 3.2 to 3.4 cm;

e) adjusting the wing nut of the punch fixture to remove the single battery; wherein the positive lug is smooth and clean and without stretching and deformation;

f) repeating the steps b-c to punch other positive lugs of the single battery;

g) stressing a bend of about 3 mm in height in a middle portion of the positive tab by an insulated tool, meanwhile, ensuring that holes are smooth and not deformed, bending directions of the positive lug and the negative lug in one single battery are identical.

5.2: Assembling the Lithium Battery Pack

Figure 14:
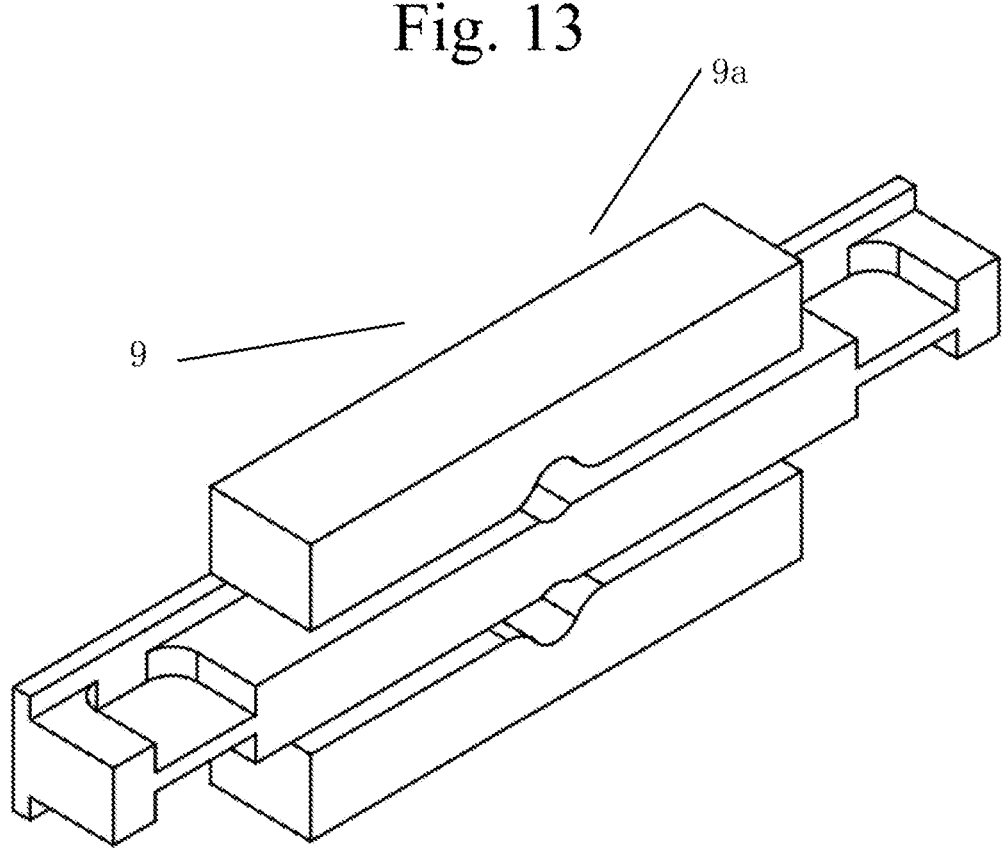
FIG. 14 is a structural schematic view of an A-shaped insulating spacer.
Figure 15:
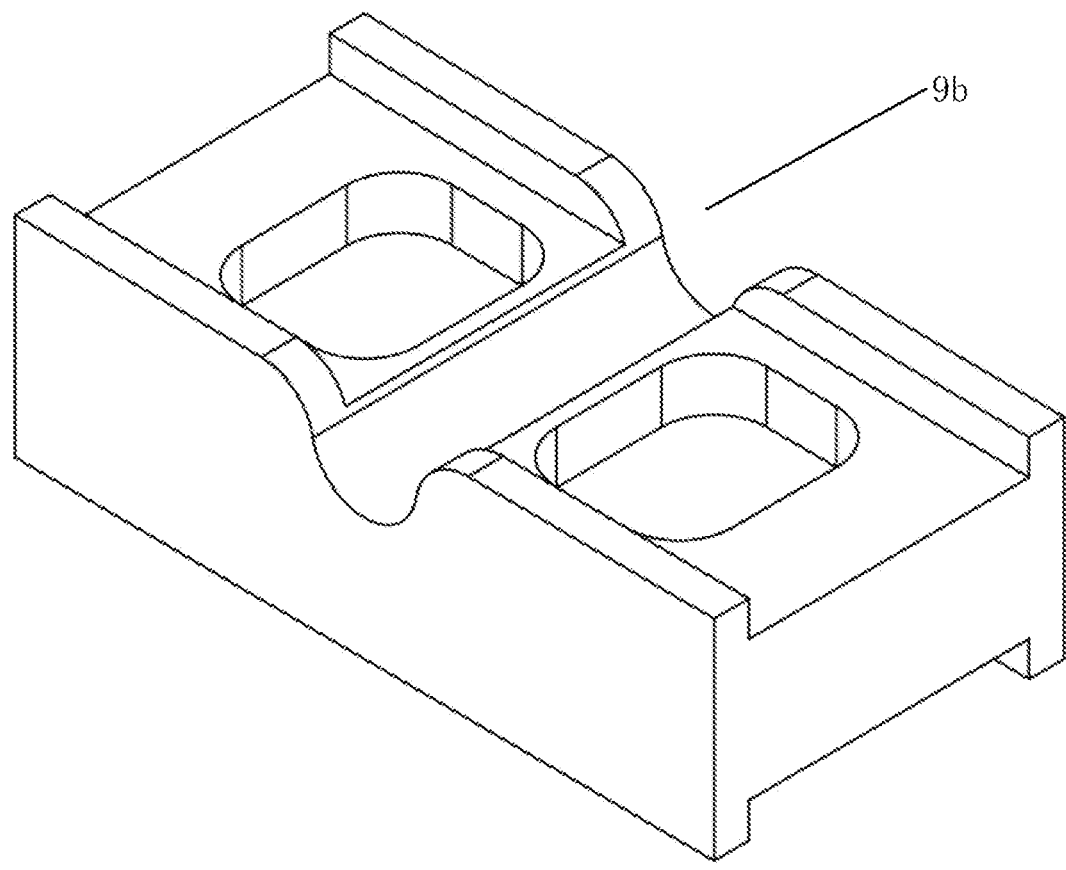
FIG. 15 is a structural schematic view of a B-shaped insulating spacer.
Figure 16:
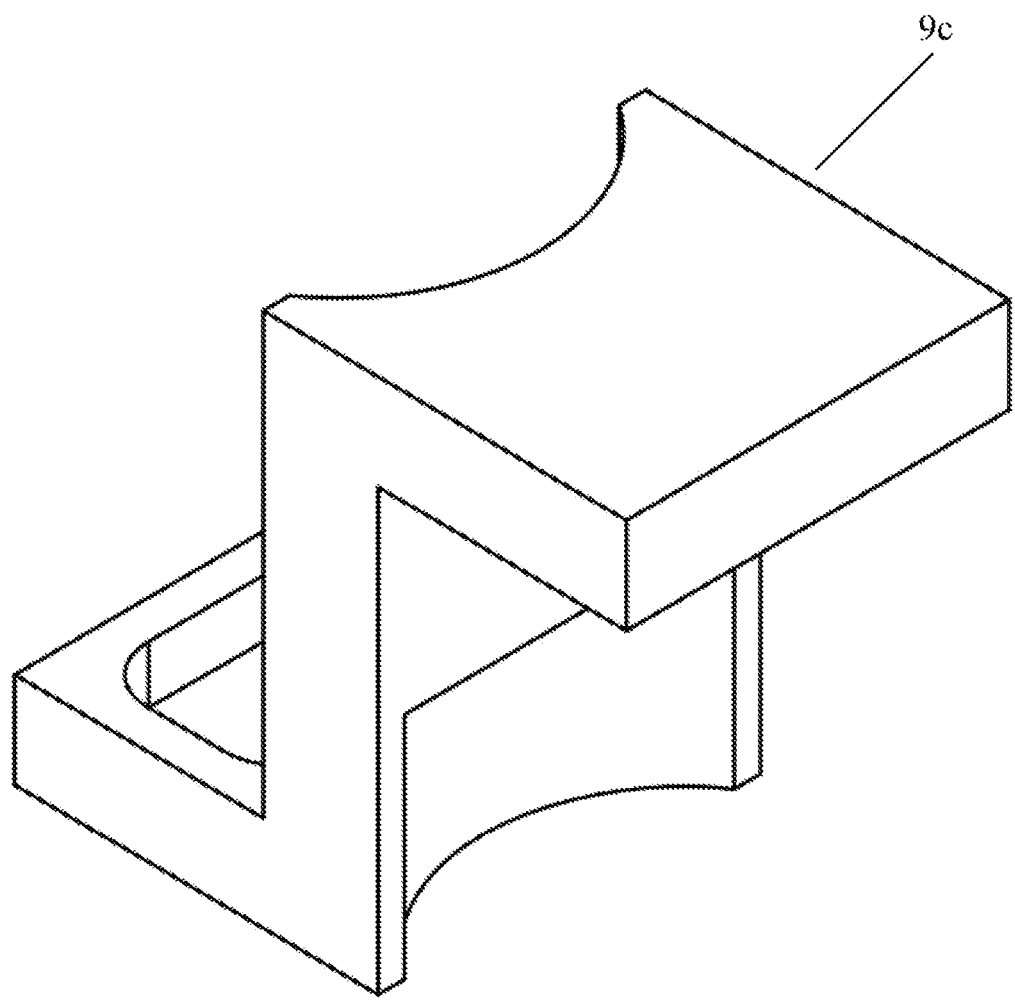
FIG. 16 is a structural schematic view of a C-shaped insulating spacer.
Figure 17:
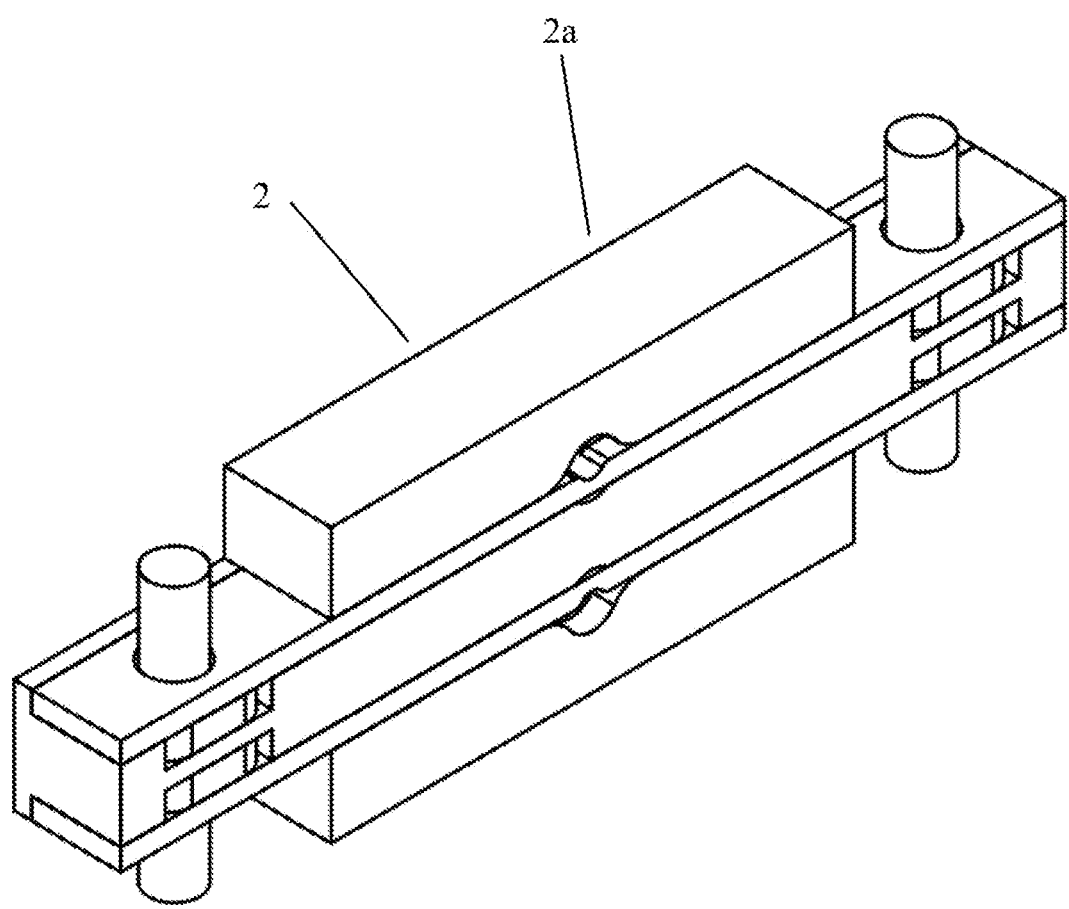
FIG. 17 is a structural schematic view of an A-shaped connecting sleeve member.
Figure 18:
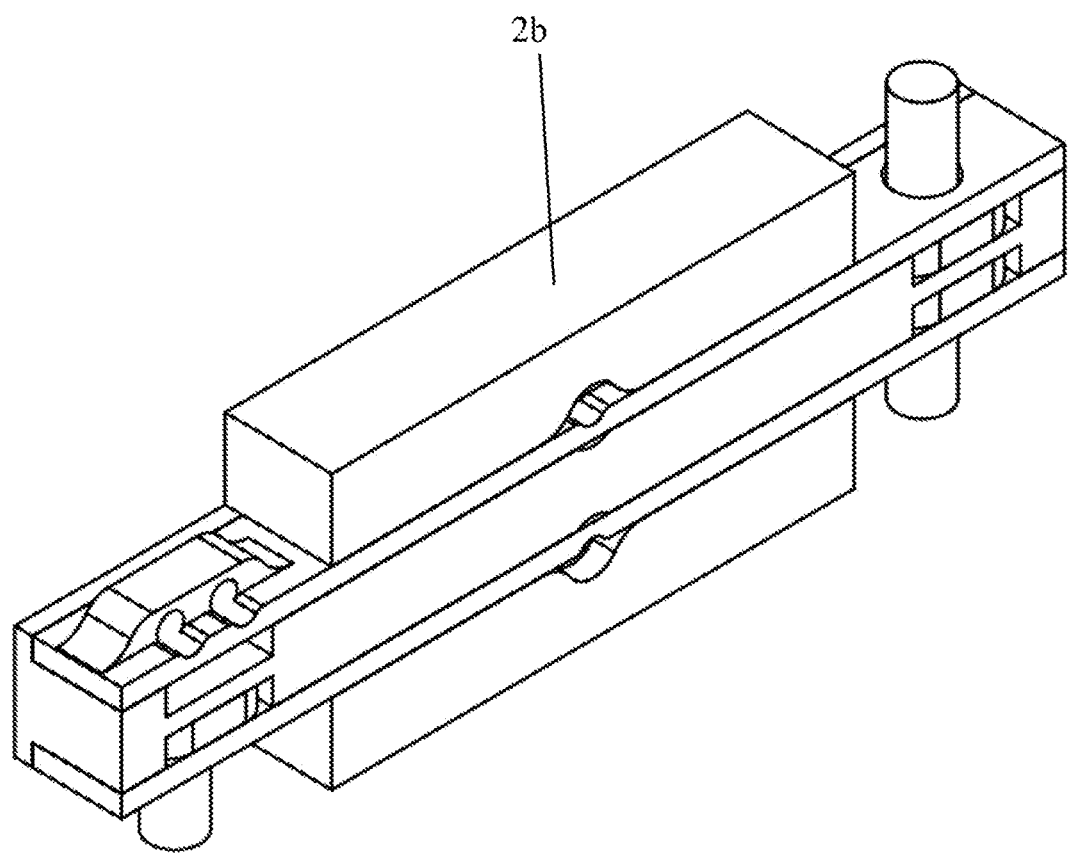
FIG. 18 is a structural schematic view of a B-shaped connecting sleeve member.
Figure 19:
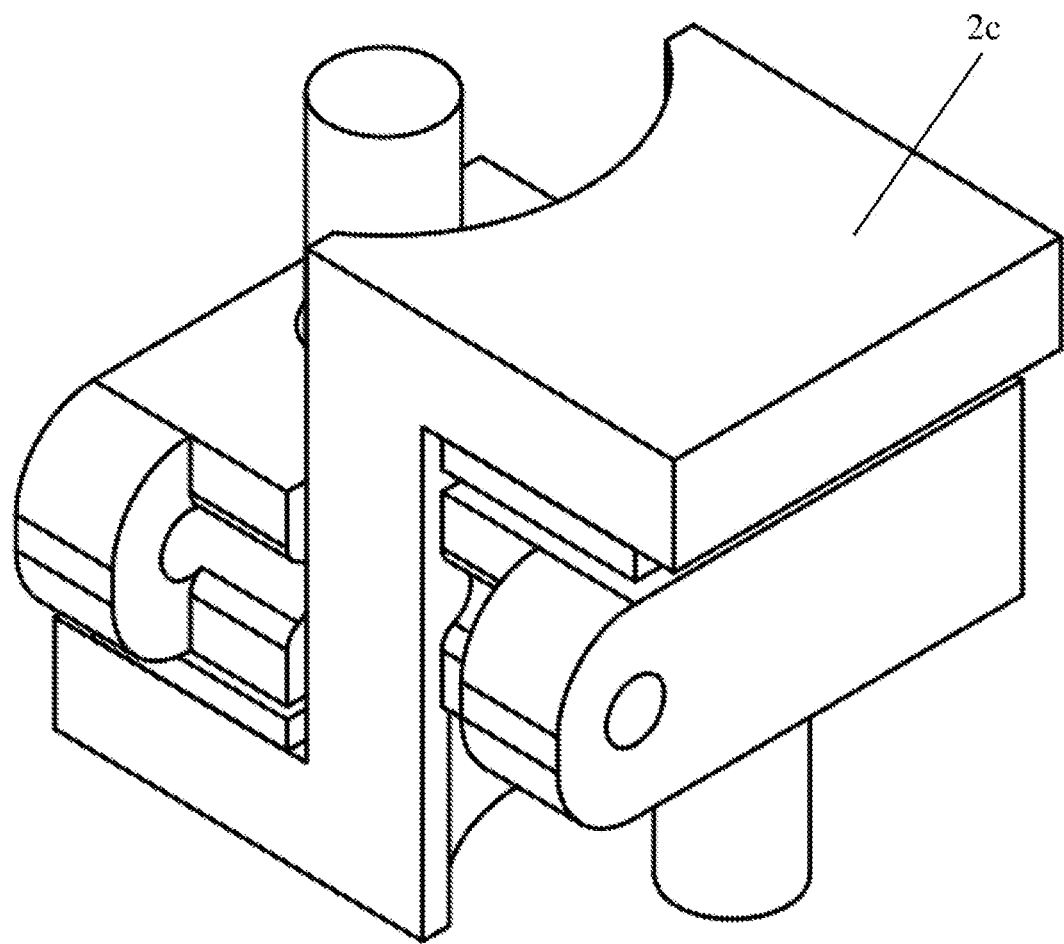
FIG. 19 is a structural schematic view of a C-shaped connecting sleeve member.
Figure 20:
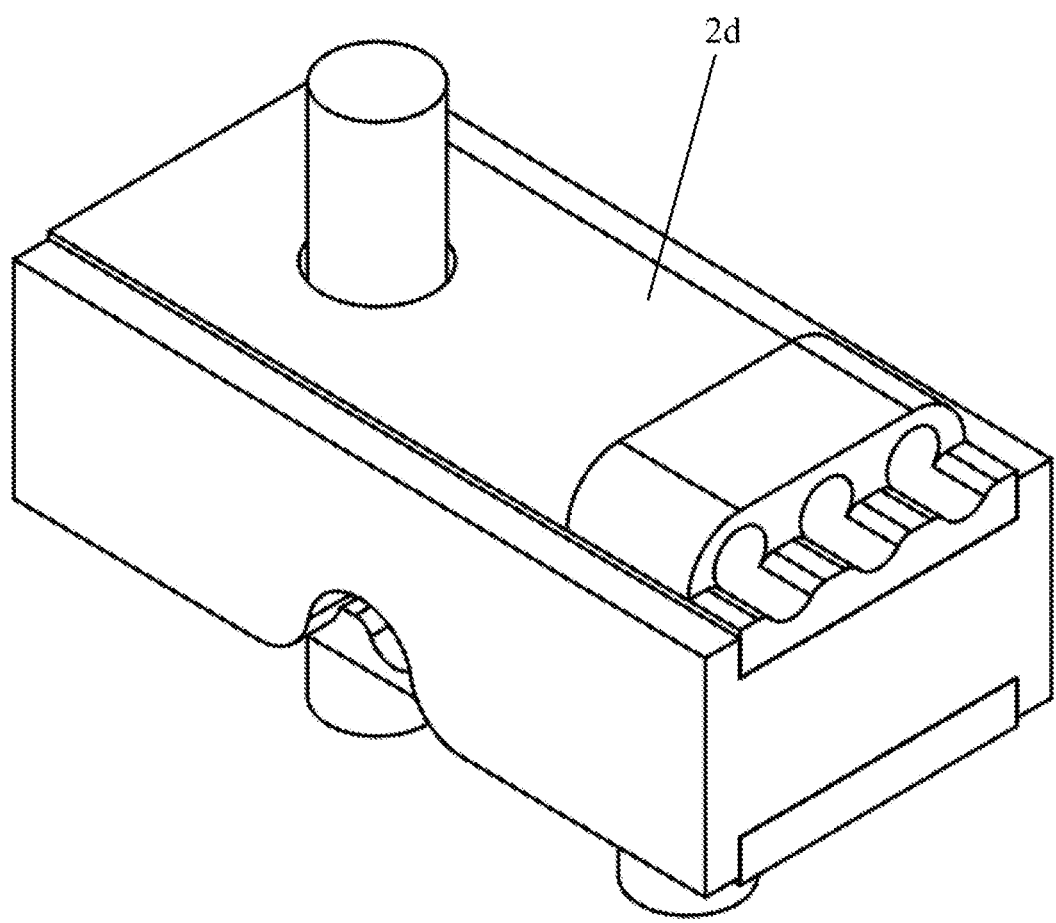
FIG. 20 is a structural schematic view of a D-shaped connecting sleeve member.
Figure 21:
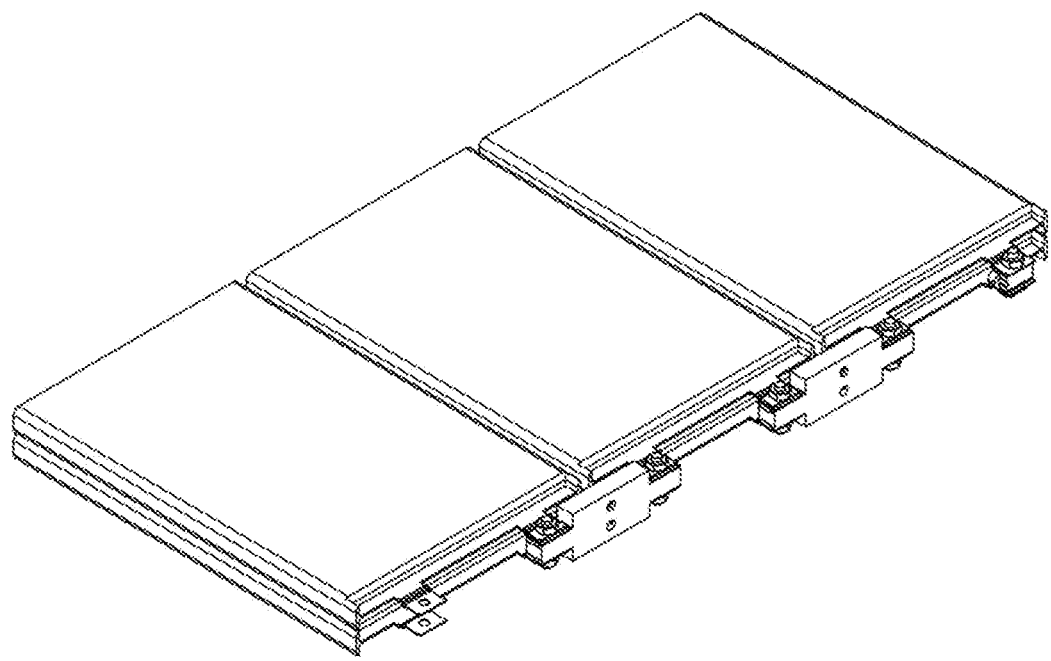
FIG. 21 is a structural stereo diagram of a first assembled battery 1.
Figure 22:
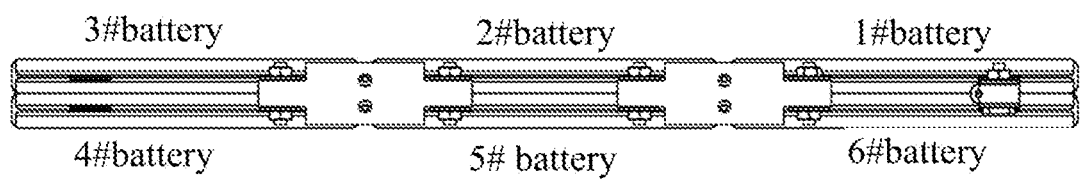
FIG. 22 is a side view of the first assembled battery 1.
Figure 23:
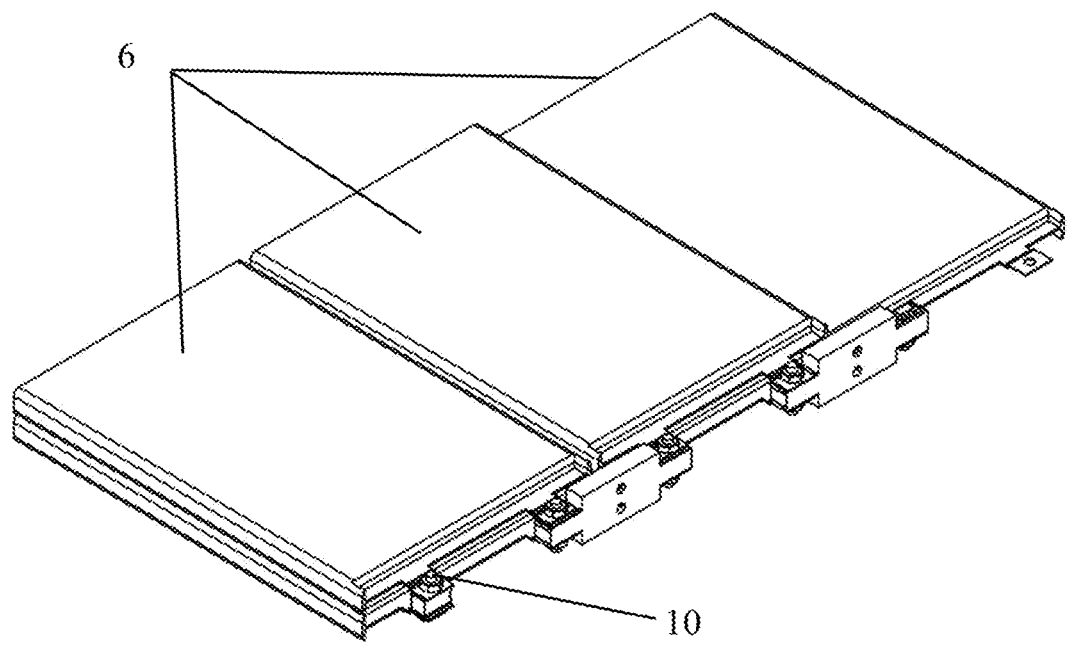
FIG. 23 is a structural stereo diagram of a second assembled battery 2.
Figure 24:
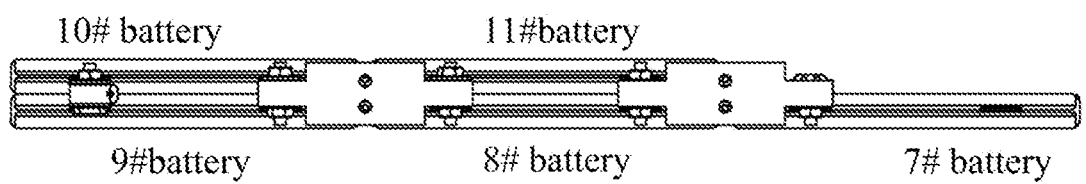
FIG. 24 is a side view of the second assembled battery 2.
Figure 25:
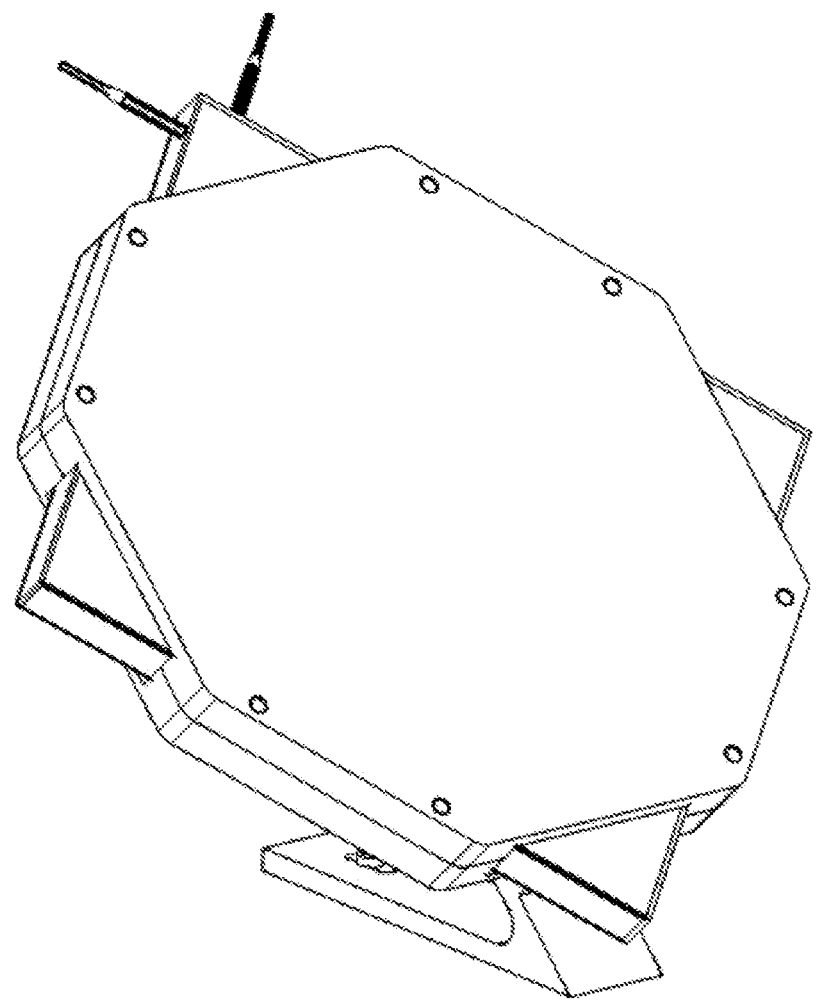
FIG. 25 is a schematic view of a placement angle of a device during process of glue feed and glue curing.

Eleven single batteries are mechanically connected by a connecting mechanism designed. For convenience of expression, the eleven single batteries are respectively denoted as 1 # single battery, 2 # single battery, 3 # single battery, . . . , and 11 # single battery. According to sizes of the battery box and the single battery, the eleven polymer lithium batteries are divided into two layers with five single batteries in an upper layer and six single batteries in a lower layer, wherein the five single batteries and the six single layers are connected in series. Specific connection steps are as follows:

a) preparing connection parts comprising: machine-shaping a copper material and silver plating to form connection straps comprising: an A-shaped connection strap 8a, a B shaped connection strap 8b, a C-shaped connection strap 8c, a D-shaped connection strap 8d, an E-shaped connection strap 8e and an F-shaped connection strap 8f; which are as shown in FIGS. 8-13; then machining a material of polyimide into insulating spacers comprising: an A-shaped insulating spacer 9a, a B shaped insulating spacer 9b and a C-shaped insulating spacer 9c, which are as shown in FIGS. 14-16; machining a material of stainless steel into fasteners 10 comprising: fastening screws, nuts, flat washers and spring washers;

b) preparing connecting sleeve members comprising four types: an A-type connecting sleeve member 2a, a B-type connecting sleeve member 2b, a C-type connecting sleeve member 2c, and a D-type connecting sleeve member 2d; wherein the A-type connecting sleeve member 2a is obtained by installing two A-shaped connection straps and four fastening screw onto of a first A-shaped insulating spacer, which is as shown in FIG. 17; the B-type connecting sleeve member 2b is obtained by installing one A-shaped connection straps, one B-shaped connection strap and 3 fastening screws onto a second A-shaped insulating spacer, which is as shown in FIG. 18; the C-type insulating spacer 2c is obtained by installing a first fastening screw, a first F-shaped connection strap and a first E-shaped connection strap onto a first side of a C-shaped insulating spacer; and installing a second fastening screw, a second F-shaped connection strap and a second E-shaped connection strap onto a second side of the C-shaped insulating spacer; which are as shown in FIG. 19; the D-type connecting sleeve member 2d is obtained by installing a C-shaped connection strap, a D-shaped connection strap, three F-shaped connection straps and a fastening screw onto a B-shaped insulating spacer, which is as shown in FIG. 20;

c): preparing a first assembled battery 1 referring to FIGS. 21 and 22, respectively passing two screws at a lower end of a first A-type connecting sleeve member 2a through a negative electrode of the 4# single battery and a positive electrode of the 5 # single battery; in such a manner that the negative electrode of the 4# single battery and the positive electrode of the 5 # single battery are connected in series; then fastening with two F-shaped connection straps 8f, two flat washers, two spring washers and two nuts;

again in an identical way, connecting a negative electrode of the 5 # single battery and a positive electrode of the 6 # single battery in series by a lower end of a second A-type connecting sleeve member 2a;

connecting a negative electrode of the 1# single battery with a positive electrode of the 2# single battery in series via an upper end of the second A-shaped connecting sleeve member A by two F-shaped connection straps 8f, two flat washers, two spring washers and 2 nuts;

and finally connecting and fastening a positive electrode of the 4# single battery with a negative electrode of the 3# single battery, in such a manner that the first assembled battery 1 is obtained;

d) preparing a second assembled battery 2 referring to FIGS. 23 and 24, respectively passing two screws at a lower end of a first A-type connecting sleeve member 2a through a negative electrode of the 8# single battery and a positive electrode of the 9# single battery; in such a manner that the negative electrode of the 8# single battery and the positive electrode of the 9# single battery are connected in series; then fastening with two F-shaped connection straps 8f, two flat washers, two spring washers and two nuts;

again in an identical way, connecting a negative electrode of the 7# single battery and a positive electrode of the 8#single battery in series by a lower end of a B-type connecting sleeve member 2b;

connecting a negative electrode of the 10# single battery with a positive electrode of the 11# single battery in series via an upper end of the second A-shaped connecting sleeve member A by two F-shaped connection straps 8f, two flat washers, two spring washers and two nuts;

connecting and fastening a negative electrode of the 11# single battery with an upper end of the B-type connecting sleeve member by one F-shaped connection strap 8f, one flat washer, one spring washer and one nut;

and finally connecting and fastening a positive electrode of the 10# single battery and a negative electrode of the 9# single battery via screws, F-shaped connection straps and E-shaped connection straps on a second side of the C-type connecting sleeve member, flat washer, one spring washer and one nut; in such a manner that the second assembled battery 2 is obtained.

e) preparing a lithium battery pack

Figure 1:
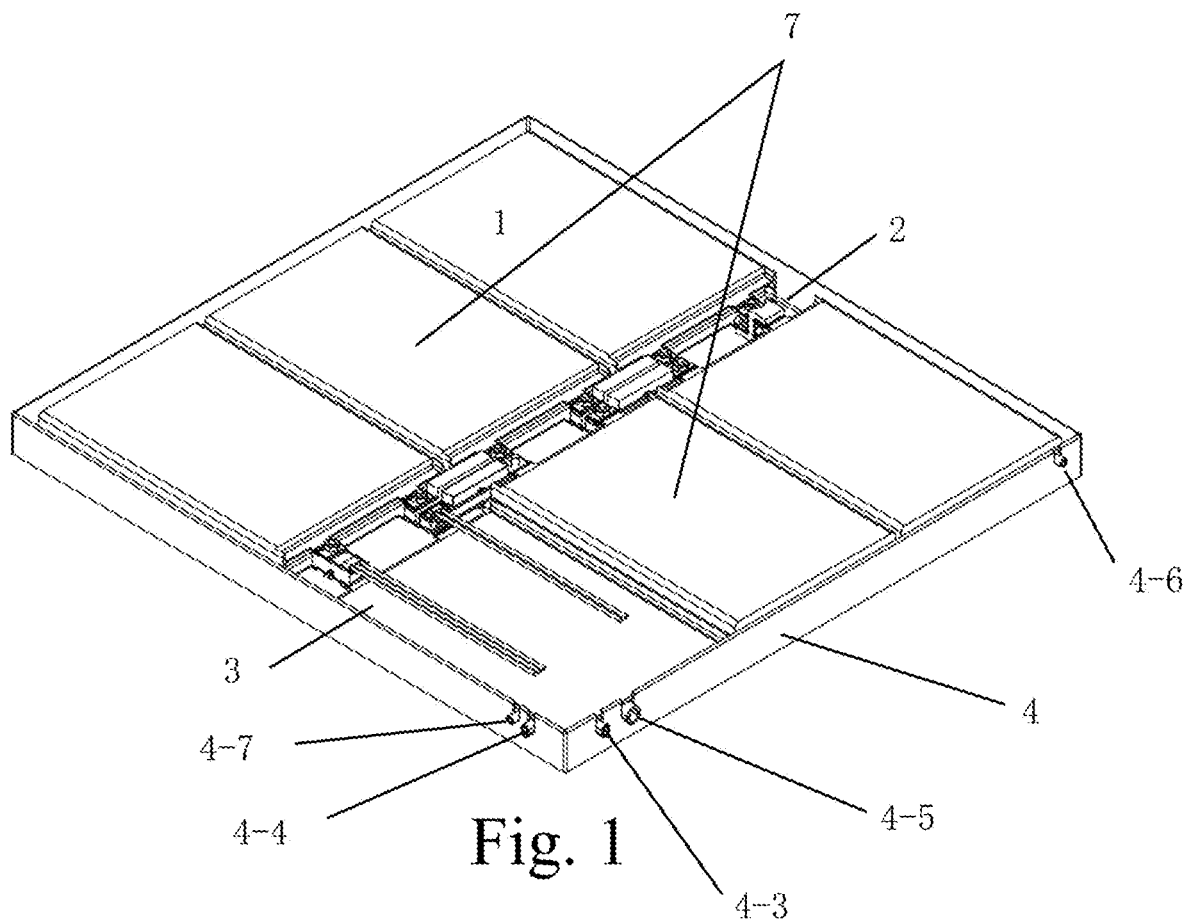
FIG. 1 is a schematic structural view of a solid-state polymer lithium battery pack according to a preferred embodiment of the present invention.

The first assembled battery 1 and the second assembled battery 2 are connected in series to form the lithium battery pack by one D-type connecting sleeve member 2d, three flat washers, three spring washers and three nuts, which is as shown in FIG. 1.

Battery pack lines connection comprises steps of: bunching a voltage detecting line with a positive and negative harness; regulating; marking all lead wires at ends thereof; wherein after led out of a cover of the lithium battery pack, a positive and negative electrode line of the lithium battery pack has a length at a range of 40 cm±1 cm; after led out of the cover of the lithium battery pack, a voltage detecting line of the lithium battery pack has a length at a range of 30 cm±1 cm; after led out of the cover of the lithium battery pack, a thermistor temperature sampling line of the lithium battery pack has a length at a range of 80 cm±1 cm; and after led out of the cover of the lithium battery pack, a ground line of the lithium battery pack has a length at a range of 30 cm±1 cm.

Step (6): Pouring the Lithium Battery Pack

The lithium battery pack adopts an overall internal potting process, and a bottom and a cover of the battery are sealed with sealant.

Punching a front face of the cover of the battery box for pouring sealant and exhaust, firstly coating expoxy glue on a sealing position of the cover and the bottom of the battery box; covering the cover and curing; and finally pouring sealant through a pre-punched hole on a side face of the battery box until the sealant overflows an observation hole and a vent hole, curing to complete pouring sealant.

The pre-punched hole on the side face of the battery box is for venting and discharging the sealant.

Pouring process: after battery assembly and electrical connection is completed, curing into an integral body with organic silica gel to obtain a lithium battery pack. Cured sealant is required to be capable of fixing batteries, electric cables and soldered circuit boards, so as to avoid frictions between each other to cause short-circuit, vibration of silicone rubber is capable of protecting the battery.

The specific process comprises:

1) preparing multi-component organic silica gel into a pouring sealant according to a certain preparation process;

2) pre-pouring the battery box bottom, that is: pouring a certain dose of the pouring sealant into the bottom of the battery box; wherein pre-pouring the bottom of the battery box specifically refers to: pouring a certain dose of the pouring sealant into the bottom of the battery box, after leveling, putting in a vacuum box, evacuating to a holding pressure of not less than −0.09 MPa, a time of not less than 15 min, allowing repeated evacuating for 2 to 3 times until no bubbles are within the sealant;

putting the lithium battery pack into the bottom of the pre-poured battery box, bundling lead wires of the lithium battery pack, and fixing a cable and bundling clasp by GD414 glue.

Here specifically:

a) forming lead wires in the lithium battery pack into a wire harness, according to requirements of QJ1722-89wire harness manufacturing process in section 5.2.2, bundling wire harness with cotton thread, wherein a bundling spacing is according to provisions of Table 9:

TABLE 9

Provisions of bundling wire harness

| Bundling diameter (mm) | Bundling spacing (mm) |
| --- | --- |
| <8 | 10~15 |
| 8~15 | 15~25 | b) after bundling the wire harness, fixing the cable and wire bundling clasp with GD414 glue, wherein a curing time of the GD414 glue is 24 h;

c) heat shrink forming the voltage detecting line by a heat shrink sleeve with a length of 30 mm and a diameter of 5 CM; heat shrink forming a power positive and negative cable by a heat shrink sleeve with a length of 30 mm and a diameter of 3 CM; and heat shrink forming the ground line by a heat shrink sleeve with a length of 30 mm and a diameter of 1 CM;

d) sending the thermistor on a surface of the DDC07 single batteries, heat shrink forming the electric cable by a heat shrink sleeve with a length of 30 mm and a diameter of 1 CM;

e) passing all the wires into corresponding slots at corresponding positions, and utilizing polyimide tape to assist the positioning and finally, fixing with GD414 glue and curing for 24 h;

f) visual observing the battery pack and the battery box, removing excess material;

then pouring sealant before sealing comprising: slowly adding the pouring sealant into the bottom of the battery box until a height of the pouring sealant reaches a half of a thickness of an upper battery layer; wherein the pouring sealant before sealing specifically refers to: putting the lithium battery pack (7) into a bottom of the battery box; lifting an upper battery layer with a fixture; adding the pouring sealant prepared slowly into the battery box; controlling a height of the pouring sealant prepared to just below the lower battery layer until the pouring sealant slowly flows leveling and covers a surface of the lower battery layer, and then removing the fixture to fall down the upper battery layer, continuing pouring sealant until a height is up to half the thickness of the upper battery layer;

3) then placing the lithium battery pack in the battery box bottom in a vacuum box until no bubbles are within the pouring sealant; evacuating to −0.08 MPa±0.005 MPa holding pressure for not less than 15 min, allowing repeatedly evacuating for 2 to 3 times until no bubbles are within the pouring sealant; and then pressing the upper-layer battery with an insulated saddle weight without sharp edge and curing under a room temperature for at least 7 days;

4) preparing sealant by room temperature cured sealant for use;

wherein the sealant is the use of room temperature curing adhesive (J-133 plastic, manufacturer: Heilongjiang Petrochemical Institute, containing A and B components: A component liquid carboxy terminated nitrile rubber (CTBN) toughening 4,4-diaminodiphenylmethane tetra functional epoxy resin and resorcinol difunctional epoxy resin, the second component is a mixed amine of polyether amine and tertiary amine) prepared by the specific preparation method comprising:

(a) according to a sealant preparation amount, selecting suitable dispensing container and stirring rod, weighing a sealant preparation container with an electronic balance, and then resetting;

(b) according to sealant preparation amount, slowly pouring the A component of GN522 organic silica gel into a center of a bottom of the dispensing container and weighing;

(c) calculating the dosage according to a weight ratio of A component and B component M:N=1:1;

(d) slowly pouring the B component onto a center of a top of the A component in the dispensing container and monitoring the electronic balance until a weight of the B component meets requirements.

(e) inserting the stirring rod into a part of the A component without the B component being poured down, and starting stirring; wherein during stirring, be careful to keep the stirring rod moving under a surface of the sealant liquid all the time, and avoid a phenomenon that air is brought into the sealant and a large number of bubbles emerges, and the stirring is completed in 5 minutes;

(f) putting the sealant prepared in a vacuum box, vacuuming until a holding pressure is not less than −0.09 MPa, a time is not less than 15 min, allowing repeated vacuuming 2-3 times until no bubbles are observed in the sealant;

An allowed operating time for preparing the pouring sealant does not exceed 0.5 hour.

5) then grinding sealed surfaces of the battery box bottom and the battery box cover, cleaning, and smearing sealant, and then covering the battery box cover to the battery box bottom, and positioning curing with a positioning tool;

Sealant sealing, specifically comprising:

a) grinding the sealing surfaces of the battery box cover and battery box bottom with sandpaper and wiping with alcohol to dry;

b) taking prepared positioning adhesive block with a blade, cutting into paper with a size of 8 mm*8 mm, and then coating a small amount of pouring sealant evenly on the upper and lower surfaces, and respectively placing in various locations on the battery, wherein 10 positioning sealant blocks are put into each battery box;

c) dipping a sealant brush in sealant, coating the sealing surfaces of the battery box cover and the battery box bottom, starting a first seal;

d) covering the battery cover on the battery box bottom, and positioning with a positioning tool, curing for a time of not less than 1 day;

e) removing the positioning tool, dipping a brush or glass rod in sealant, painted the gap between the battery cover and the bottom of the battery box to start a second seal, curing time of not less than 1 day;

f) coating GD414 glue in gaps between battery box cover and battery box bottom to start a third sealing, putting an RNF100 pipe in an injection hole and a vent hole preserved in the battery box at the same time, adhering with GD414 glue, curing for a time of not less than 1 day.

Finally, pouring sealant after sealing is performed, that is, pouring sealant again through the injection holes pre-punched on side surfaces of the battery box cover until the observation holes and the vent holes overflow with the sealant, curing to complete pouring sealant. The pouring sealant after sealing specifically comprises following steps of: pre-punching an injection hole and a vent hole on a front surface of the battery box cover, covering the battery box with a protective layer; putting the battery box in a sealant pouring tool, wherein the injection hole and the vent hole on the battery box face upward, then slowly inserting an injection pipe into the injection hole, injecting a dose of the pouring sealant prepared into the battery box through the injection pipe by a disposable syringe; and putting the lithium battery pack into a vacuum box, evacuating to a −0.065 MPa±0.005 MPa holding pressure for not less than 30 min; then repeating injecting sealant and evacuating until no bubbles overflow and a small amount of the pouring sealant exists in the injection pipe and an exhaust pipe; then taking the lithium battery pack and the sealant pouring tool out of the vacuum box; curing for not less than 14 days.

Specific operations of sealing the battery pack comprises following steps of:

(a) sending the battery pack to the battery box bottom after completing electrical connection;

(b) lowering a height of the pouring sealant in the battery box bottom to a half of a mergence height of the upper-layer battery and curing;

(c) pouring the pouring sealant into a fixture clamp, preparing positioning sealant block with a height of about 2.2 mm, curing for use;

(d) placing the positioning sealant block with a height of about 2.2 mm on surfaces of a total of 5 single batteries on an upper layer of the battery pack;

(e) then gluing a sealing position of the battery box cover and the battery box bottom with epoxy glue;

(f) covering, and then curing by a fixture tool;

(g) removing the fixture tooling, removing the battery box, gluing the epoxy sealant again on the sealing position of the battery box, curing, and applying GD414 glue in the sealed position, curing, completing sealing the battery box after gluing for three times;

(h) adding an RNF pipe with a height of 10 cm and a diameter of 3 mm in the injection hole and the vent hole of the battery box and fixing with GD414 glue;

(i) according to the drawings, placing the battery box on a holder bracket, the pouring sealant is injected inside the battery box with an RNF100 pipe through the injection hole slowly;

(j) and then taking the sealant with an disposable syringe, slowly injecting into the battery box via a PVC pipe in the injection hole, terminating injecting until the injection hole and the vent hole have the sealant, sending into a vacuum box and evacuating, holding pressure and venting until no bubbles escape and a surface of the sealant is higher than a top of the battery box, curing under a room temperature;

(k) cleaning the battery box to complete the sealant pouring and sealing.

Step (7) Testing Battery

The step (7) testing battery comprises: testing performance of the battery pack at an ambient temperature, reviewing discharge data, examining discharge capacity, and measuring battery voltage after charging and discharging. Specific test conditions and parameters are in Table 10.

TABLE 10

MFSLB battery temperature performance test

| Items | | Parameters | Limit condition |
|---|---|---|---|
| Charging | Standing | 5 min | — |
| | Constant current charging | 2 A | Voltage: 46.2 V |
| | Constant voltage charging | 46.2 V | Current 0.2 A |
| Discharging | Standing | 30 min | Standing for 10 min and then detecting a voltage of the battery |
| | Constant current discharging | 2 A | Voltage: 33 V |
| Charging | Standing | 30 min | Standing for 10 min and then detecting a voltage of the battery |
| | Constant current charging | 2 A | Charging for 2 h |
| | Standing | 10 min | Terminating Detecting a voltage of the battery after terminating |

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A solid-state polymer lithium battery pack, comprising: single batteries (1), connecting sleeve members (2), electric cables (3), a battery box (4) and pouring sealant;

wherein the single batteries (1) are solid-state polymer lithium-ion batteries composed of a lithium cobalt oxide positive electrode, a graphite negative electrode, a polymer separator, an aluminum alloy positive tab, a nickel-copper alloy negative tab and an Al compound packing film;

a plurality of the single batteries (1) are connected in series by a screw connection manner with the connecting sleeve members (2) to form assembled batteries (6);

a plurality of the assembled batteries (6) are connected in series to form a lithium battery pack (7) ;

and finally the lithium battery pack (7) is put into the battery box (4) made of a composite material, a potting process is utilized to fill the battery box (4) with the pouring sealant having insulation and thermal conductivity, so as to fix the single batteries (1) and the electric cables (3) inside and discharge air in the battery box (4) to obtain the solid-state polymer lithium battery pack finally;

wherein the connecting sleeve members (2) comprise: connection straps (8), insulating spacers (9) and fasteners (10);

wherein the connection straps (8) are prepared by machine-shaping a copper material and silver plating, comprising: a first connection strap (8a), a second connection strap (8b), a third connection strap (8c), a connection strap (8d), a fourth connection strap (8e) and an fifth connection strap (8f); the insulating spacers (9) are made of a material of polyimide comprising: an first insulating spacer (9a), a second insulating spacer (9b) and a third insulating spacer (9c);

the fasteners (10) are made of stainless steel material comprising: fastening screws, nuts, flat washers and spring washers;

the connecting sleeve members (2) comprise four types: an A-type connecting sleeve member (2a), a B-type connecting sleeve member (2b), a C-type connecting sleeve member (2c), and a D-type connecting sleeve member (2d);

wherein the A-type connecting sleeve member (2a) is obtained by installing two A-type connection straps and four fastening screw onto of a first A-type insulating spacer;

the B-type connecting sleeve member (2b) is obtained by installing one A-type connection strap, one B-type connection strap and 3 fastening screws onto a second A-type insulating spacer;

the C-type connecting sleeve member (2c) is obtained by installing a first fastening screw, a first F-type connection strap and a first E-type connection strap onto a first side of a C-type insulating spacer; and installing a second fastening screw, a second F-type connection strap and a second E-type connection strap onto a second side of the C-type insulating spacer;

the D-type connecting sleeve member (2d) is obtained by installing a C-type connection strap, a D-type connection strap, three F-type connection straps and a fastening screw onto a B-type insulating spacer.

2. The solid-state polymer lithium battery pack, as recited in claim 1, wherein single batteries (1) have a laminated structure inside, which comprises multiple layers of a separator, a positive pole piece and a negative pole piece;

wherein the positive pole piece is prepared by synthesizing paste utilizing $LiCoO_2$, $LiFePO_4$ and ternary material of NCA, NCM, conductive agent and adhesive agent;

wherein the conductive agent comprises: acetylene carbon black, superconducting carbon black and graphite; and the adhesive agent is polyvinylidene difluoride homopolymer; the paste is filmed and then double-sided heat-compounded on a perforated aluminum foil for collecting fluid, dried, grinded, laser sliced to prepare a positive pole piece; the negative pole piece is made of carbon material (graphite) as the a main active material, the conductive agent, and a binder:

a main body of the separator is made of polyvinylidene difluoride homopolymer; an entire body of the single batteries are in a dry state, an energy density of the single batteries (1) is greater than 180 Wh/kg, a battery capacity of the single batteries is not less than 10 Ah, and a rated voltage thereof is 4.2V, each of the single batteries is a rectangular structure with a size of 132 mm×87 mm×9 mm and a weight of less than 220 g.

3. The solid-state polymer lithium battery pack, as recited in claim 2, wherein the battery box (4) comprises a battery box bottom (4-1) and a battery box cover (4-2);

wherein the battery box bottom (4-1) is made of M40 carbon fiber laminated composite material, wherein a wall thickness is 1.0 mm; a shape size of the battery box bottom (4-1) is 297 mm×277 mm×19 mm;

a material and a laminated manner of the battery box cover (4-2) are identical to the battery box bottom (4-1); a wall thickness thereof is 1.0 mm, a shape size thereof is 300 mm×280 mm×20 mm;

a cabling hole (4-3) for a positive line of the battery charging/discharging, a cabling hole (4-4) for a negative line of the battery charging/discharging, and a cabling hole (4-5) for a voltage detection line, a cabling hole (4-6) for a ground wire, a cabling hole (4-7) for a temperature sensor wire, a plastic injection hole (4-8) and a vent hole (4-9) are opened on a side wall of the battery box and on corresponding positions of the bottom and the cover of the battery box;

both the positive line of the battery charging/discharging and the negative line of the battery charging/discharging is utilized for charging and discharging; in addition, the circuit is in redundancy design, that is, both the positive line and the negative line adopt double-point double-wire to ensure safety;

the voltage detection line is used for detecting a voltage signal of the single battery, wherein the number of the positive lines is identical to the number of the single batteries; and the positive lines and the single batteries are respectively connected to the positive pole piece of each single battery, and the negative pole piece of each single battery share a negative line;

a temperature sensor is provided inside the solid-state polymer lithium battery, and a lead wire of the temperature sensor is led out through the temperature sensor wire cabling hole (4-7) for monitoring internal temperature of the battery pack.

4. The solid-state polymer lithium battery pack, as recited in claim 1, wherein each of the single batteries (1) comprises a single battery body and a positive tab and a negative tab disposed on a side surface of the single battery body;

fastening holes are respectively provided on the positive tab and the negative tab; the fastening holes are used for screw connection with the connecting sleeve member (2), so as to connect each of the single batteries in series.

* * * * *